(12) United States Patent
Henman et al.

(10) Patent No.: US 9,494,700 B2
(45) Date of Patent: Nov. 15, 2016

(54) NODE LOCKS FOR MARINE DEPLOYMENT OF AUTONOMOUS SEISMIC NODES

(71) Applicant: Seabed Geosolutions B.V., Leidschendam (NL)

(72) Inventors: Richard Edward Henman, Horsham (GB); Johan Fredrik Næs, Trondheim (NO); Arne Henning Rokkan, Olsvik (NO); Mariann Ervik, Trondheim (NO);
(Continued)

(73) Assignee: SEABED GEOSOLUTIONS B.V., Leidschendam (NL)

( * ) Notice: Subject to any disclaimer, the term of this patent is extended or adjusted under 35 U.S.C. 154(b) by 0 days.

(21) Appl. No.: 14/736,926

(22) Filed: Jun. 11, 2015

(65) Prior Publication Data
US 2015/0362606 A1    Dec. 17, 2015

Related U.S. Application Data

(60) Provisional application No. 62/012,058, filed on Jun. 13, 2014.

(51) Int. Cl.
| | |
|---|---|
| *G01V 1/38* | (2006.01) |
| *G01V 1/20* | (2006.01) |
| *B63B 21/08* | (2006.01) |
| *B63B 21/58* | (2006.01) |
| *B63B 21/66* | (2006.01) |

(52) U.S. Cl.
CPC ............. *G01V 1/201* (2013.01); *B63B 21/08* (2013.01); *B63B 21/58* (2013.01); *B63B 21/66* (2013.01); *G01V 1/38* (2013.01); *G01V 1/3843* (2013.01)

(58) Field of Classification Search
CPC ................... G01V 1/38; G01V 1/3843; G01V 1/201; G01V 1/3852; B63B 21/08; B63B 21/58; B63B 21/66
USPC ............. 367/15, 20; 405/158, 166, 167, 173
See application file for complete search history.

(56) References Cited

U.S. PATENT DOCUMENTS

| | | | | |
|---|---|---|---|---|
| 2,166,916 A | * | 7/1939 | Lombard | ................... F16L 3/13 248/222.12 |
| 4,912,817 A | * | 4/1990 | Sandreid | ................. F16G 11/10 24/132 R |
| 5,070,805 A | | 12/1991 | Plante | |

(Continued)

FOREIGN PATENT DOCUMENTS

| | | | | |
|---|---|---|---|---|
| FR | 2497758 A | * | 7/1982 | ............. B63B 21/08 |
| GB | 2492889 | | 1/2013 | |

(Continued)

OTHER PUBLICATIONS

Wilcock, W.S.D. et al.: "The Deployment of a Long-Term Seafloor Seismic Network on the Juan de Fuca Ridge", Oceans 2007, IEEE, Piscataway, NJ, USA, Sep. 29, 2007, pp. 1-6.

*Primary Examiner* — Daniel L Murphy
(74) *Attorney, Agent, or Firm* — Park, Vaughan, Fleming & Dowler LLP; Shane A. Nelson

(57) ABSTRACT

Embodiments, including apparatuses, systems and methods, for attaching autonomous seismic nodes to a deployment cable. In an embodiment, an apparatus includes a seismic node having a direct attachment mechanism configured to directly attach the seismic node to a deployment line, the direct attachment mechanism being configurable between an open and/or unlocked position and a closed and/or locked position to release and retain the deployment line.

35 Claims, 35 Drawing Sheets

(72) Inventors: Leif Johan Larsen, Alversund (NO); Fredrik Lund, Trondheim (NO); Robert Schistad, Bergen (NO)

(56) References Cited

U.S. PATENT DOCUMENTS

| | | | |
|---|---|---|---|
| 6,024,344 A | 2/2000 | Buckley | |
| 6,044,786 A | 4/2000 | Dudley | |
| 6,288,972 B1 | 9/2001 | Norris | |
| 6,657,921 B1 | 12/2003 | Ambs | |
| 7,092,315 B2 | 8/2006 | Olivier | |
| 7,254,093 B2 | 8/2007 | Ray | |
| 7,260,024 B2 | 8/2007 | Goujon | |
| 7,286,442 B2 | 10/2007 | Ray | |
| 7,310,287 B2 | 12/2007 | Ray | |
| 7,561,493 B2 | 7/2009 | Ray | |
| 7,602,667 B2 | 10/2009 | Thompson | |
| 7,646,670 B2 | 1/2010 | Maxwell | |
| 7,649,803 B2 | 1/2010 | Ray et al. | |
| 7,668,047 B2 | 2/2010 | Ray et al. | |
| 7,724,607 B2 | 5/2010 | Ray et al. | |
| 7,778,114 B2 | 8/2010 | Goujon et al. | |
| 7,804,737 B2 | 9/2010 | Thompson | |
| 7,883,292 B2 | 2/2011 | Thompson | |
| 7,929,378 B2 | 4/2011 | Gros | |
| 7,933,165 B2 | 4/2011 | Thompson | |
| 7,986,589 B2 | 7/2011 | Ray | |
| 7,990,803 B2 | 8/2011 | Ray et al. | |
| 8,021,080 B2 | 9/2011 | Frivik | |
| 8,050,140 B2 | 11/2011 | Ray | |
| 8,087,848 B2 | 1/2012 | Thompson | |
| 8,096,253 B1 | 1/2012 | Ruffa | |
| 8,149,647 B2 | 4/2012 | Borgen | |
| 8,172,480 B2 | 5/2012 | Thompson | |
| 8,226,328 B2 | 7/2012 | Thompson | |
| 8,228,761 B2 | 7/2012 | Ray | |
| 8,328,467 B2 | 12/2012 | Thompson | |
| 8,427,900 B2 | 4/2013 | Fleure | |
| 8,619,495 B2 | 12/2013 | Thompson | |
| 8,675,446 B2 | 3/2014 | Gateman | |
| 8,801,328 B2 | 8/2014 | Thompson | |
| 8,864,416 B2 | 10/2014 | Thompson | |
| 8,879,362 B2 | 11/2014 | Ray | |
| 8,942,059 B2 | 1/2015 | Furuhaug | |
| 9,170,344 B2 | 10/2015 | Lindberg | |
| 2005/0052951 A1 | 3/2005 | Ray et al. | |
| 2005/0276161 A1 | 12/2005 | Olivier | |
| 2008/0080318 A1* | 4/2008 | Maxwell | G01V 1/16 367/131 |
| 2010/0054079 A1 | 3/2010 | Thompson et al. | |
| 2011/0217123 A1* | 9/2011 | Jewell | F16L 1/16 405/158 |
| 2013/0028047 A1 | 1/2013 | Erofeev et al. | |
| 2013/0163374 A1 | 6/2013 | Herrmann | |
| 2014/0198607 A1 | 7/2014 | Etienne | |
| 2014/0211589 A1 | 7/2014 | Maxwell | |

FOREIGN PATENT DOCUMENTS

| | | |
|---|---|---|
| WO | 2005074426 A2 | 8/2005 |
| WO | 2006/041438 A1 | 4/2006 |
| WO | 2011/139159 A1 | 11/2011 |
| WO | 2014/027892 A1 | 2/2014 |
| WO | 2014/084741 A1 | 6/2014 |

* cited by examiner

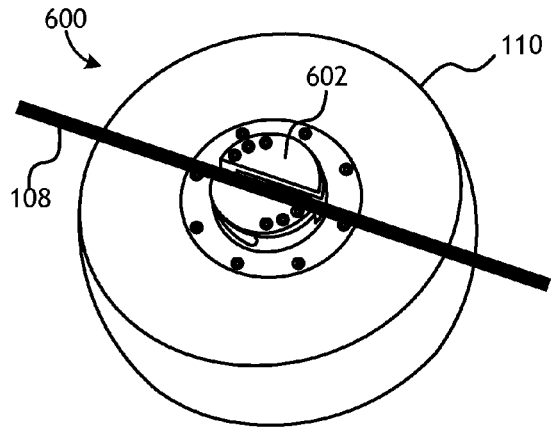 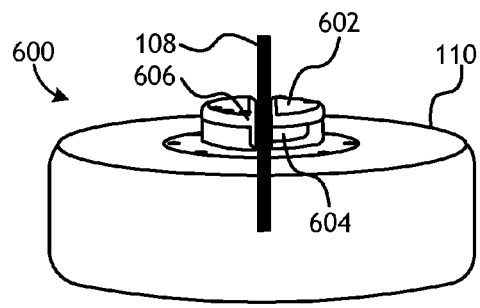
FIG. 6A  FIG. 6B
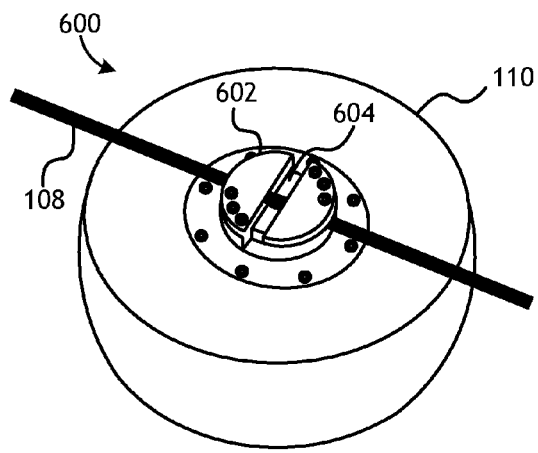 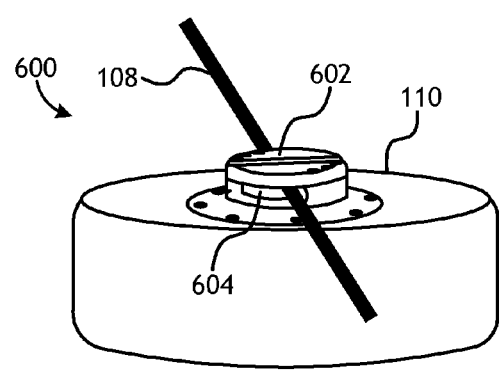
FIG. 6C  FIG. 6D
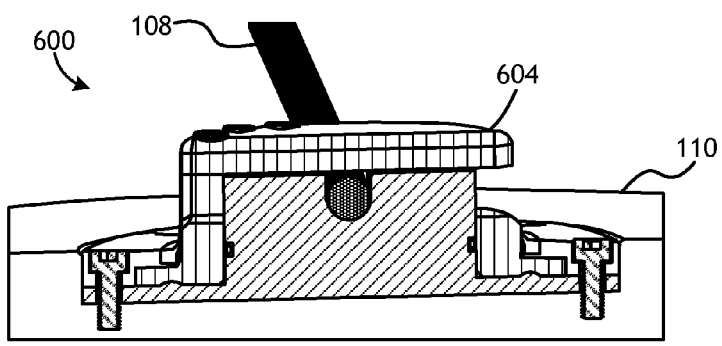
FIG. 6E

NODE LOCKS FOR MARINE DEPLOYMENT OF AUTONOMOUS SEISMIC NODES

PRIORITY

This application claims priority to U.S. provisional patent application No. 62/012,058, filed on Jun. 13, 2014, the entire content of which is incorporated herein by reference.

BACKGROUND OF THE INVENTION

1. Field of the Invention

This invention relates to marine seismic systems and more particularly relates to attachment and/or locking mechanisms utilized for marine deployment of autonomous seismic nodes.

2. Description of the Related Art

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through seawater and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

In general, either ocean bottom cables (OBC) or ocean bottom nodes (OBN) are placed on the seabed. For OBC systems, a cable is placed on the seabed by a surface vessel and may include a large number of seismic sensors, typically connected every 25 or 50 meters into the cable. The cable provides support to the sensors, and acts as a transmission medium for power to the sensors and data received from the sensors. One such commercial system is offered by Sercel under the name SeaRay®. Regarding OBN systems, and as compared to seismic streamers and OBC systems, OBN systems have nodes that are discrete, autonomous units (no direct connection to other nodes or to the marine vessel) where data is stored and recorded during a seismic survey. One such OBN system is offered by the Applicant under the name Trilobit®. For OBN systems, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel.

Autonomous ocean bottom nodes are independent seismometers, and in a typical application they are self-contained units comprising a housing, frame, skeleton, or shell that includes various internal components such as geophone and hydrophone sensors, a data recording unit, a reference clock for time synchronization, and a power source. The power sources are typically battery-powered, and in some instances the batteries are rechargeable. In operation, the nodes remain on the seafloor for an extended period of time. Once the data recorders are retrieved, the data is downloaded and batteries may be replaced or recharged in preparation of the next deployment One known node storage, deployment, and retrieval system is disclosed in U.S. Pat. No. 7,883,292 to Thompson, et al. ("Thompson '292"), and is incorporated herein by reference. Thompson et al. discloses a method and apparatus for storing, deploying and retrieving a plurality of seismic devices, and discloses attaching the node to the deployment line by using a rope, tether, chain, or other cable such as a lanyard that is tied or otherwise fastened to each node and to a node attachment point on the deployment line. U.S. Pat. No. 6,024,344 to Buckley, et al. ("Buckley") also involves attaching seismic nodes to the deployment line. Buckley teaches that each node may be connected to a wire that is then connected to the deployment line though a separate connector. This connecting wire approach is cumbersome because the wires can get tangled or knotted, and the seismic nodes and related wiring can become snagged or tangled with structures or debris in the water or on the sea floor or on the marine vessel. U.S. Pat. No. 8,427,900 to Fleure, et al. ("Fleure") and U.S. Pat. No. 8,675,446 to Gateman, et al. ("Gateman") each disclose a deployment line with integral node casings or housings for receiving seismic nodes or data recorders. One problem with integration of the casings with the deployment line is that the deployment line becomes difficult to manage and store. The integrated casings make the line difficult to wind onto spools or otherwise store manageably. In these embodiments, the node casings remain attached directly in-line with the cable, and therefore, this is a difficult and complex operation to separate the electronics sensor package from the node casings.

The referenced shortcomings are not intended to be exhaustive, but rather are among many that tend to impair the effectiveness of previously known techniques in seafloor deployment systems; however, those mentioned here are sufficient to demonstrate that the methodologies appearing in the art have not been satisfactory and that a significant need exists for the systems, apparatuses, and techniques described and claimed in this disclosure.

The existing techniques for attaching an autonomous node to a cable suffer from many disadvantages. As an example, attaching a node to a rope that is coupled to the deployment line often gets tangled during deployment and/or retrieval to the seabed, and does not consistently land flat on the seabed, which can cause poor seabed/node coupling and noise. The spiraling of the tether cable can also cause problems during the retrieval when separating the node from the cable. Further, prior techniques of pre-mounted node casings on the deployment line or pre-cut connecting ropes/wires between the node and the deployment line do not allow for a flexible change in adjacent node spacing/distance; any change of node spacing requires significant amount of cost and time. Further, the techniques in which such nodes are deployed and retrieved from a marine vessel, as well as the manner in which such nodes are stored and handled on the vessel, suffer from many disadvantages. A marine vessel should be configured to efficiently deploy and recover nodes before and after their use in the water. A novel node and node deployment system is needed that is autonomous, limits the need for operator involvement and handling of the nodes, and is very fast and efficient. A novel node and node deployment system is needed that can directly attach nodes to a deployment line and provide more accurate placement and coupling of the nodes to the seabed.

SUMMARY OF THE INVENTION

Embodiments, including apparatuses, systems and methods, for attaching autonomous seismic nodes to a deployment cable. In an embodiment, an apparatus includes a seismic node having a direct attachment mechanism configured to directly attach the seismic node to a deployment line, the direct attachment mechanism being configurable between an open and closed position to release and retain the deployment line. In one embodiment, an embodiment of a system includes a deployment line, a marine vessel, and a plurality of autonomous seismic nodes each having a direct attachment mechanism configured to directly attach the seismic node to the deployment line.

In one embodiment, the seismic node comprises a body configured to be directly coupled to a length of the deployment line by the attachment mechanism. In such an embodiment, the direct attachment mechanism may include a receiver configured to receive the length of the deployment line and a locking mechanism or retainer configured to securely hold a portion of the deployment line within the receiver. In one embodiment, the locking mechanism may comprise a leading end that is configured to receive the deployment line and a trailing end that is configured for retaining the deployment line.

The direct attachment mechanism may couple an end surface of the body of the seismic node to the length of the deployment line in one embodiment. Alternatively, the direct attachment mechanism may couple a side surface of the body of the seismic node to the length of the deployment line. In another embodiment, the direct attachment mechanism may couple a center portion of the body of the seismic node to the length of the deployment line. In one embodiment, a plurality of direct attachment mechanisms are attached to a plurality of sides of the node, and in other embodiments, one or more direct attachment mechanisms are positioned on one face of the node. The direct attachment mechanism may be coupled to the node in a variety of configurations and/or locations, and may be coupled to the pressure housing of the node and/or the non-pressure housing of the node.

The attachment mechanism may comprise a latch, wherein the latch is configured to rotate between a closed and open position. The direct attachment mechanism may comprise a bias member, such as a spring, configured to bias the attachment mechanism in a closed position. In other embodiments, the attachment mechanism may comprise one or more protrusions that are configured for attaching the deployment line to the seismic node. In another embodiment, the direct attachment mechanism comprises a rotatable retaining member configured to rotate about an axis. The attachment mechanism may be flexible or stiff, or have components (such as locking mechanisms) that may be flexible or stiff. The direct attachment mechanism may be configured to allow rotational movement of the body of the seismic node about a linear axis of the deployment line. In a further embodiment, the direct attachment mechanism includes a lock configured to lock the body of the seismic node to an attachment site of the deployment line.

Embodiments of methods are also described. In an embodiment, a method may include deploying a length of deployment line configured to receive at least one seismic node. Such a method may also include positioning the at least one seismic node relative to the length of the deployment line. Additionally, the method may include attaching the at least one seismic node directly to the length of the deployment line using a direct attachment mechanism. In a further embodiment, the method may include attaching a plurality of seismic nodes to a plurality of sections of the deployment line. The method may also include actuating the direct attachment mechanism into a receiving position for receiving the length of the deployment line. Additionally, the method may include actuating the direct attachment mechanism into a closed position for retaining the length of the deployment line. In another embodiment, a method may include retrieving a length of deployment line, the deployment line having at least one seismic node, wherein each of the attached seismic nodes is attached directly to the deployment line with a direct attachment mechanism, and detaching the at least one seismic node from the length of the deployment line. In an embodiment, the method may include actuating the direct attachment mechanism into a releasing position for releasing the length of the deployment line. In an embodiment, the method may also include applying a tool to the direct attachment mechanism to move it between a locked and unlocked position. In such an embodiment the tool may include a roller or flat steel bar configured to actuate the direct attachment mechanism as the length of deployment line is retrieved. In still other embodiments, the deployment line may be physically forced (e.g., pushed or pulled) from the direct attachment mechanisms to lock and unlock the deployment line to the node.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 6A is a perspective view diagram illustrating another embodiment of a direct attachment mechanism for marine deployment of a seismic node.

FIG. 6B is a side view diagram illustrating one embodiment of the direct attachment mechanism of FIG. 6A.

FIG. 6C is a perspective view diagram illustrating one embodiment of the direct attachment mechanism of FIG. 6A after attachment.

FIG. 6D is a side view diagram illustrating one embodiment of the direct attachment mechanism of FIG. 6A after attachment.

FIG. 6E is a cross-section view diagram illustrating one embodiment of the direct attachment mechanism of FIG. 6A after attachment.

DETAILED DESCRIPTION

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Node Deployment

Figure 1A:
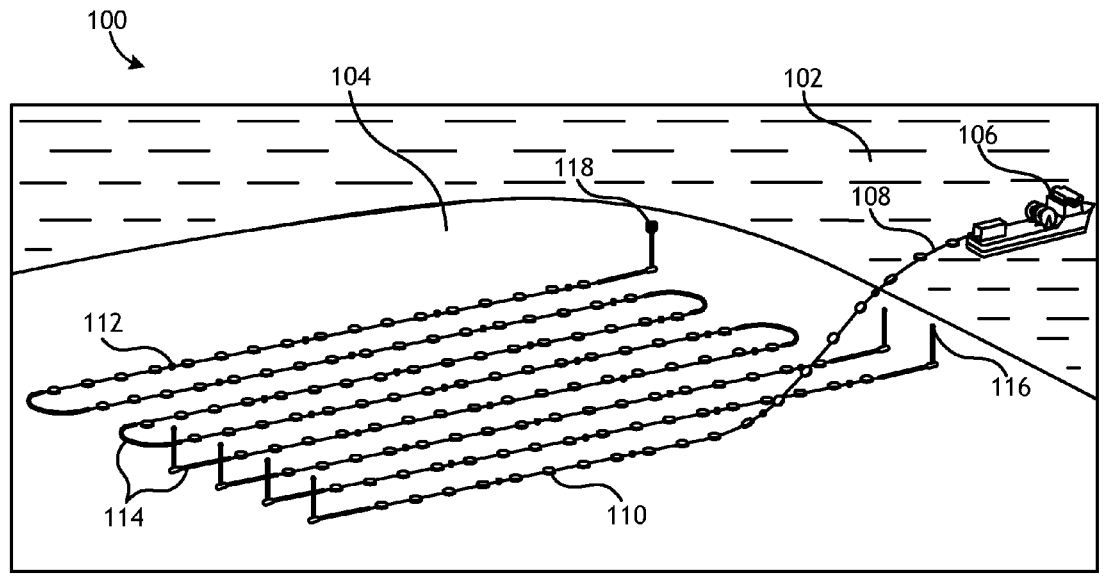
FIG. 1A is a schematic diagram illustrating one embodiment of a system for marine deployment of an autonomous seismic node.
Figure 1B:
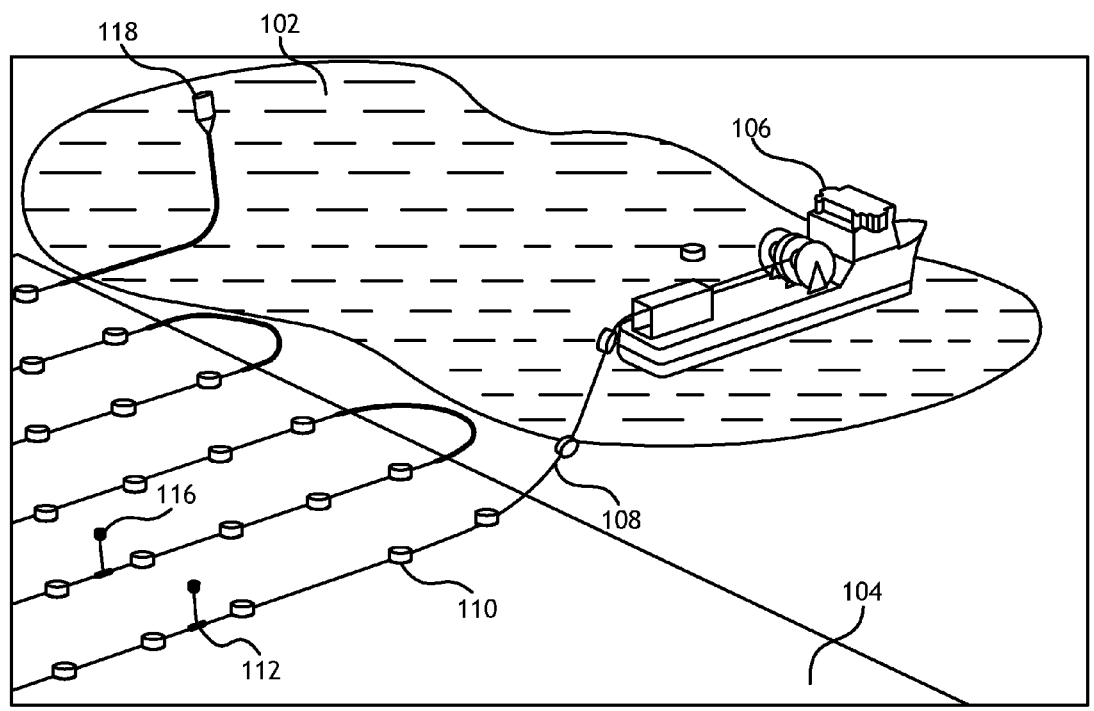
FIG. 1B is a schematic diagram illustrating one embodiment of a system for marine deployment of an autonomous seismic node.

FIGS. 1A and 1B illustrate a layout of a seabed seismic recorder system that may be used with autonomous seismic nodes for marine deployment. FIG. 1A is a diagram illustrating one embodiment of a marine deployment system 100 for marine deployment of seismic nodes 110. One or more marine vessels deploy and recover a cable (or rope) with attached sensor nodes according to a particular survey pattern. In an embodiment, the system includes a marine vessel 106 designed to float on a surface 102 of a body of water, which may be a river, lake, ocean, or any other body of water. The marine vessel 106 may deploy the seismic nodes 110 in the body of water or on the floor 104 of the body of water, such as a seabed. In an embodiment, the marine vessel 106 may include one or more deployment lines 108 (i.e., deployment cables). One or more seismic nodes 110 may be attached directly to the deployment line 108. Additionally, the marine deployment system 100 may include one or more acoustic positioning transponders 112, one or more weights 114, one or more pop up buoys 116, and one or more surface reference buoys 118. As is standard in the art, weights 114 can be used at various positions of the cable to facilitate the lowering and positioning of the cable, and fixed marker buoys 118 or subsurface releasable buoys 116 may be used on the cable to locate, retrieve, and/or raise various portions of the cable. Acoustic positioning transponders 112 may also be used selectively on various portions of the cable to determine the positions of the cable/sensors during deployment and post deployment. The acoustic positioning transponders 112 may transmit on request an acoustic signal to the marine vessel for indicating the positioning of the seismic nodes 110 on the sea floor 104. In an embodiment, the weights 114 may be coupled to the deployment line 108 and be arranged to keep the seismic nodes 110 in a specific position relative to the sea floor 104 at various points, such as during start, stop, and snaking of the deployment line 108.

FIG. 1B is a close-up view illustrating one embodiment of a system 100 for marine deployment of seismic nodes 110. In an embodiment, the deployment line 108 may be a metal cable (steel, galvanized steel, or stainless steel). Alternatively, the deployment line 108 may include chain linkage, rope (polymer), wire, or any other suitable material for tethering to the marine vessel 106 and deploying one or more seismic nodes 110. In an embodiment, the deployment line 108 and the seismic nodes 110 may be stored on the marine vessel 106. For example, the deployment line may be stored on a spool or reel or winch. The seismic nodes 110 may be stored in one or more storage containers. One of ordinary skill may recognize alternative methods for storing and deploying the deployment line 108 and the seismic nodes 110.

In one embodiment, the deployment line 108 and seismic nodes 110 are stored on marine vessel 106 and deployed from a back deck of the vessel 106, although other deployment locations from the vessel can be used. As is well known in the art, a deployment line 108, such as a rope or cable, with a weight attached to its free end is dropped from the back deck of the vessel. The seismic nodes 110 are preferably directly attached in-line to the deployment line 108 at a regular, variable, or selectable interval (such as 25 meters) while the deployment line 108 is lowered through the water column and draped linearly or at varied spacing onto the seabed. During recovery each seismic node 110 may be clipped off the deployment line 108 as it reaches deck level of the vessel 106. Preferably, nodes 110 are clipped directly onto the deployment line 108 in an automated process using node attachment or coupling machines on board the deck of the marine vessel 106 at one or more workstations or containers. Likewise, a coupling machine is configured to decouple or otherwise disengage the seismic nodes 110 from the deployment line 108, and in some instances may use a detachment tool for such detaching. Alternatively, the seismic nodes 110 can be attached via manual or semi-automatic methods. The seismic nodes 110 can be attached to the deployment line 108 in a variety of configurations, which allows for proper rotation of the seismic node 110 about the deployment line 108 and allows for minimal axial movement on the deployment line 108. For example, the deployment line 108 can be attached to the top, side, or center of a seismic node 110 via a variety of configurations.

Once the deployment line 108 and the seismic nodes 110 are deployed on the sea floor 104, a seismic survey can be performed. One or more marine vessels 106 may contain a seismic energy source (not shown) and transmit acoustic signals to the sea floor 104 for data acquisition by the seismic nodes 110. Embodiments of the system 100 may be deployed in both coastal and offshore waters in various depths of water. For example, the system may be deployed in a few meters of water or in up to several thousand meters of water. In some embodiments, the depth may be between twenty (20) meters and five hundred (500) meters or more. In some configurations the marker buoy 118 or the pop up buoy 116 may be retrieved by the marine vessel 106 when the seismic nodes 110 are to be retrieved from the sea floor 104. Thus, the system 110 may not require retrieval by means of a submersible or diver. Rather, the pop up buoy 116 or marker buoy 118 may be picked up on the surface 102 and the deployment line 108 may be retrieved along with the seismic nodes 110.

Autonomous Seismic Node Design

Figure 2A:
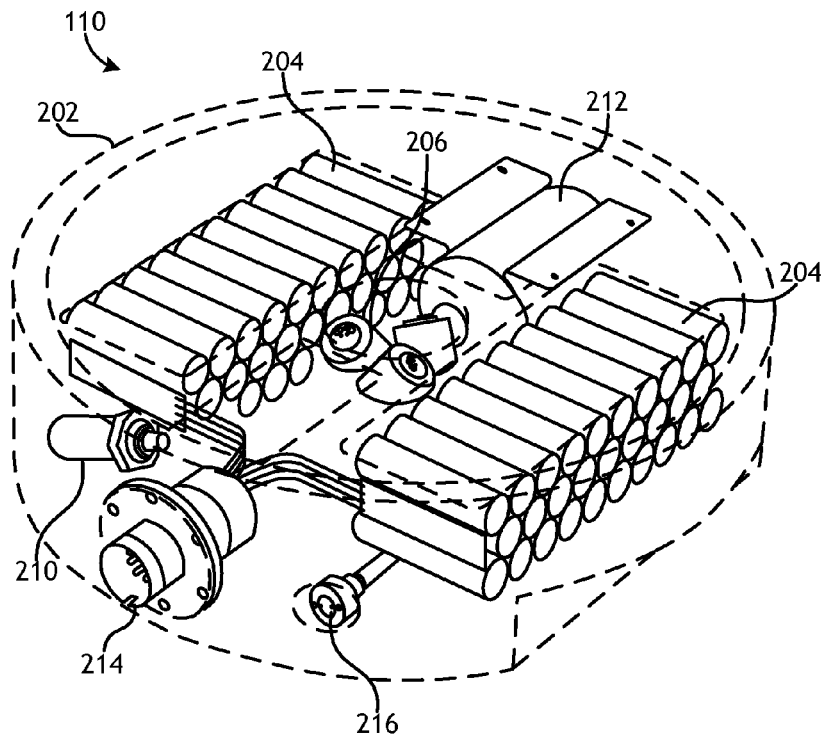
FIG. 2A illustrates a perspective view diagram of one embodiment of an autonomous seismic node.

FIG. 2A illustrates a perspective view diagram of an autonomous ocean bottom seismic node 110. The seismic node 110 may include a body 202, such as a housing, frame, skeleton, or shell, which may be easily dissembled into various components. Additionally, the seismic node 110 may include one or more battery cells 204. In an embodiment, the battery cells 204 may be lithium-ion battery cells or rechargeable battery packs for an extended endurance (such as 90 days) on the seabed, but one of ordinary skill will recognize that a variety of alternative battery cell types or configurations may also be used. Additionally, the seismic node may include a pressure release valve 216 configured to release unwanted pressure from the seismic node 110 at a pre-set level. The valve protects against fault conditions like water intrusion and outgassing from a battery package. Additionally, the seismic node may include an electrical connector 214 configured to allow external access to information stored by internal electrical components, data communication, and power transfer. During the deployment the connector is covered by a pressure proof watertight cap 218 (shown in FIG. 2B). In other embodiments, the node does not have an external connector and data is transferred to and from the node wirelessly, such as via electromagnetic or optical links.

In an embodiment, the internal electrical components may include one or more hydrophones 210, one or more (preferably three) geophones 206 or accelerometers, and a data recorder 212. In an embodiment, the data recorder 212 may be a digital autonomous recorder configured to store digital data generated by the sensors or data receivers, such as hydrophone 210 and the one or more geophones or accelerometers 206. One of ordinary skill will recognize that more or fewer components may be included in the seismic node 110. For example, there are a variety of sensors that can be incorporated into the node including and not exclusively, inclinometers, rotation sensors, translation sensors, heading sensors, and magnetometers. Except for the hydrophone, these components are preferably contained within the node housing that is resistant to temperatures and pressures at the bottom of the ocean, as is well known in the art.

Figure 2B:
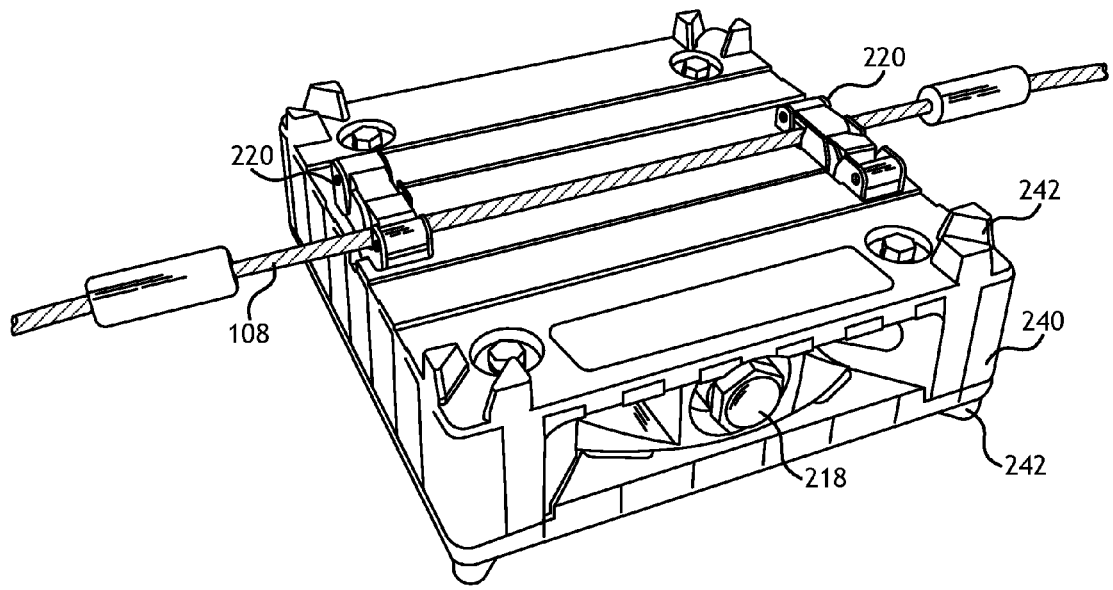
FIG. 2B illustrates a perspective view diagram of another embodiment of an autonomous seismic node.

While the node in FIG. 2A is circular in shape, the node can be any variety of geometric configurations, including square, rectangular, hexagonal, octagonal, cylindrical, and spherical, among other designs, and may or may not be symmetrical about its central axis. In one embodiment, the node consists of a watertight, sealed case or pressure housing that contains all of the node's internal components. In one embodiment, the node is square or substantially square shaped so as to be substantially a quadrilateral, as shown in FIG. 2B. One of skill in the art will recognize that such a node is not a two-dimensional object, but includes a height, and in one embodiment may be considered a box, cube, elongated cube, or cuboid. In one embodiment, the node is approximately 350 mm×350 mm wide/deep with a height of approximately 150 mm. In one embodiment, the body 202 of the node has a height of approximately 100 mm and other coupling features, such as node locks 220 or fenders 242, may provide an additional 20-50 mm or more height to the node.

In another embodiment, as shown in FIG. 2B, the node's pressure housing may be coupled to and/or substantially surrounded by an external non-pressurized node housing 240 that may include integrated fenders and/or bumpers. Various portions of the node housing 240 may be open and expose the pressurized node housing as needed, such as for hydrophone 210, node locks 220, and data/power transfer connection 214 (shown with a fitted pressure cap 218 in FIG. 2B). In one embodiment, the upper and lower portions of the fender housing include a plurality of gripping teeth or protrusions 242 for engaging the seabed and for general storage and handling needs. In other embodiments, a bumper is attached to each of the corners of the node housing via bolts or pins. In another embodiment, portions of the housing, such as the corners, include grooved pockets or recesses or receptacles that engage a corresponding mating unit on the node housing for integrated stacking/storing of the nodes. External node housing 240 provides many functions, such as protecting the node from shocks and rough treatment, coupling the node to the seabed for better readings and stability, and assisting in the stackability, storing, alignment, and handling of the nodes. Each node housing may be made of a durable material such as rubber, plastic, carbon fiber, or metal. In still other embodiments, the seismic node 110 may include a protective shell or bumper configured to protect the body.

Node Locks

In one embodiment, the seismic node 110 comprises one or more direct attachment mechanisms and/or node locks 220 that may be configured to directly attach the seismic node 110 to a deployment line 108. This may be referred to as direct or in-line node coupling. In one embodiment, the attachment mechanism 220 comprises a locking mechanism to help secure or retain the deployment line 108 to the seismic node 110. A plurality of direct attachment mechanisms may be located on any surfaces of the node 110 or node housing 240, as shown in FIGS. 3A-3G. In one embodiment, a plurality of node locks 220 is positioned substantially in the center and/or middle of a surface of a node or node housing. The node locks may attach directly to the pressure housing and extend through the node housing 240. In this embodiment, a deployment line, when coupled to the plurality of node locks, is substantially coupled to the seismic node on its center axis. In some embodiments, the node locks may be offset or partially offset from the center axis of the node, which may aid the balance and handling of the node during deployment and retrieval. The node locks 220 are configured to attach, couple, and/or engage a portion of the deployment line to the node. Thus, a plurality of node locks 220 operates to couple a plurality of portions of the deployment line to the node. The node locks are configured to keep the deployment line fastened to the node during a seismic survey, such as during deployment from a vessel until the node reaches the seabed, during recording of seismic data while on the seabed, and during retrieval of the node from the seabed to a recovery vessel.

The node locks may be coupled to and decoupled from the deployment line on a marine vessel via automatic, semi-automatic, or manual methods, such as that described in U.S. Patent Application No. 62/034,620, filed on Aug. 7, 2014, incorporated herein by reference. For example, a roping/coupling/attaching station or container may be used that positions and/or couples the autonomous seismic nodes with the deployment line. In one embodiment, the deployment line 108 is stopped in the correct position and the seismic node 110 is manually attached to the deployment line 108, and in another embodiment the seismic node 110 is accelerated to match the deployment speed of the deployment line 108 and automatically attached to the deployment line. In a further embodiment, a reference marker on specified intervals of the deployment line 108, such as ferrules, colored painted markers, magnetic paint, or any low profile marking system such as heat shrink, may be used to align the deployment line 108 with the appropriate portions of the attachment mechanism on the seismic node 110 for attaching the seismic node to the deployment line. The node lock configuration depends on the coupling/decoupling machine, and vice-versa. Each of the disclosed attachment mechanisms may be moved from an open and/or unlocked position to a closed and/or locked position via autonomous, semi-autonomous, or manual methods. In one embodiment, the components of node lock 220 are made of titanium, stainless steel, aluminum, and/or other substantially inert and non-corrosive materials.

As shown in FIG. 2B, two node locks 220 are positioned substantially in the middle top face of the node. The node locks may be asymmetrical and oriented in opposing and/or offset orientations for better stability when deploying and retrieving the node from the seabed and for manufacturing/assembly purposes. Node locks may be configured in a positively open and/or a positively closed position, depending on the type of coupling/decoupling machines used. In some embodiments, a spring mechanism is used to bias the node lock in a closed and/or open position, and in other embodiments other biasing members may be used, such as a flexible plate, a torsion spring, or other bendable/twistable biasing members, as well as offset travel paths for the deployment wire causing it to act as a spring due to its in-line stiffness. Although not shown in FIG. 2B, a ferrule or other stopping mechanism may be located on either side of the node on the deployment line, which helps prevent movement of the node on the deployment line, facilitates attaching/detaching of the node from the line, and facilitates seismic acoustic decoupling between the deployment line and the node. In other embodiments, ferrules and other stoppers can be used as a single stop between adjacent nodes (e.g., only one ferrule between each node), a plurality of redundant stoppers can be used between each node, or a double stopper and swivel type arrangement can be used between each node. A ferrule or stopper may limit the movement of the node by many configurations, such as by a sliding attachment point where the node slides between the stoppers, or the stopper may slide inside a cavity of the node and act as a sliding cavity stopper. The position of the stopper(s) on the deployment line and the coupling of the node to the deployment line is configured for acoustic decoupling between the node and the deployment line. In one embodiment, the distance between adjacent ferrules is greater than the diameter of the node, which facilitates the node to be seismically de-coupled from the wire/rope of the deployment line. In some embodiments, each node lock acts as and/or may be coupled to a swivel to allow rotation of the node around the deployment line.

Figure 2C:
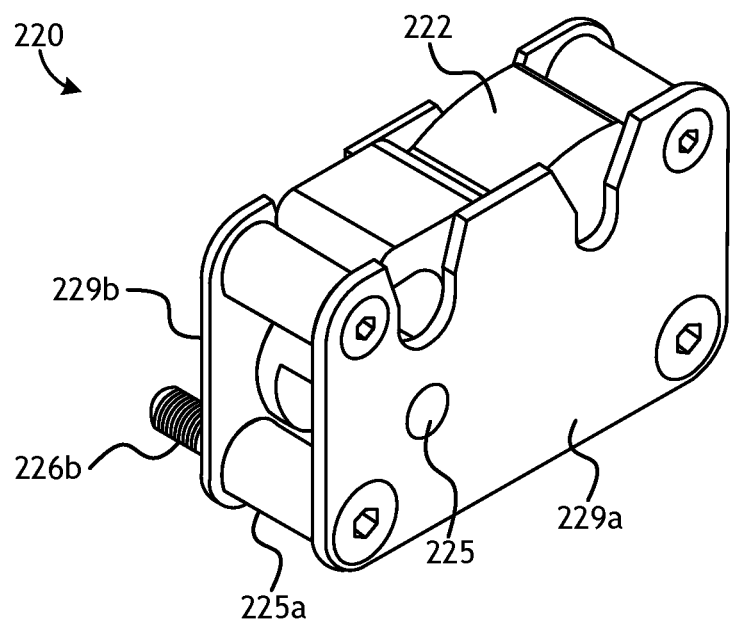
FIG. 2C illustrates a perspective view diagram of one embodiment of a direct attachment mechanism that may be coupled to an autonomous seismic node.
Figure 2D:
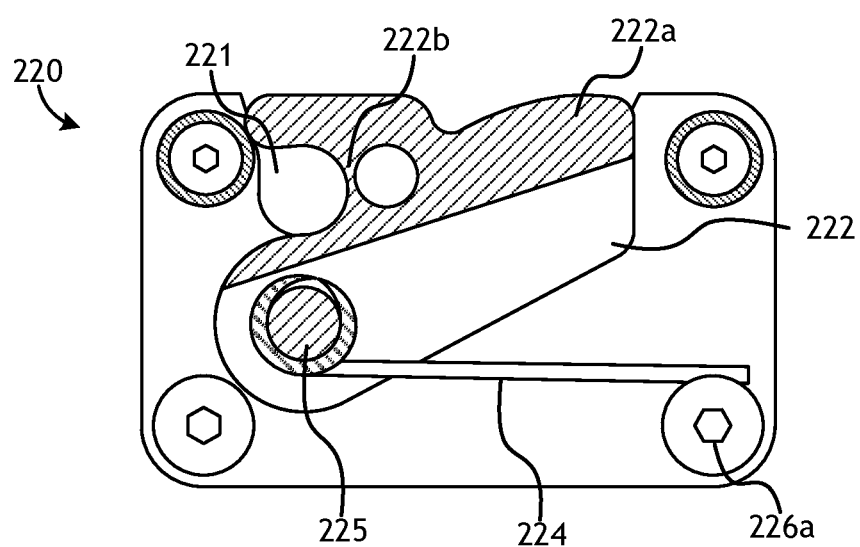
FIG. 2D illustrates a side view diagram of one embodiment of the direct attachment mechanism from FIG. 2C.

FIGS. 2C-2F illustrate one embodiment of a direct attachment mechanism that may be coupled to an autonomous seismic node. FIGS. 2C and 2D illustrate a perspective view and side view diagram, respectively, of a direct attachment mechanism or node lock 220. Node lock 220 may comprise a latch 222 that is configured to move between an open and/or unlocked position and a closed and/or locked position. Node lock 220 may comprise one or more face plates 229 that are coupled to latch 222. In one embodiment, node lock 220 may comprise base plate 229b and top plate 229a. Node lock 220 may comprise a plurality of screws 226 that fasten latch 222 and face plates 229 together. In some embodiments, a spacer 225 is positioned between the face plates and is configured to receive screw 226. The length of the spacer may be approximately the width of the latch 222. A first portion of screw 226a may be countersunk into top plate 229a and a second portion of screw 226b may extend through node lock 220 and be configured to attach directly to the seismic node 108. In some embodiments, a plurality of screws couple node lock 220 to node 108. In one embodiment, each node lock comprises four screws: when viewed from the side, two screws on an upper portion of the node lock and two screws on a bottom portion of the node lock. The lower screws may be fastened to the node and the upper screws may be retained by nuts that may be countersunk into the base plate.

Latch 222 may be coupled to a spring 224 and a latch pin or shaft 225. Latch 222 is able to move from an open position to a closed position by rotation of the latch around shaft 225. Spring 224 is configured to keep and maintain the latch in a closed position. The latch may be actuated and/or open by depressing and/or engaging portion 222a of the latch. When 222a is not depressed, spring 224 biases the latch to a closed position. The latch, when in the closed position, is geometrically biased over center so that any force transmitted to the latch will not cause it to open. Node lock 220 further comprises an opening 221 that is configured to receive a deployment line 108 and may be formed between face plates 229 and latch 222. In one embodiment, opening 221 is configured to receive a wide variety of other structures, such as rope, rods, shafts, pins, and other cylindrical or non-cylindrical objects. The node lock is in an open position when the opening 221 is open and/or configured to receive a deployment line (e.g., the latch is depressed at portion 222a) and is in a closed position when the opening 221 is closed and/or not configured to receive a retaining structure (e.g., the latch portion 222a is not actuated). By opening and closing node lock 220, the lock is configured to retain and release a deployment line or other similar fastening object. In some embodiments, latch 222 may have a weak portion 222b that is configured to break when a predetermined amount of force is applied to the node (whether directly or through the deployment line). For example, in some situations a node lock may fail and/or the latch may not move between a closed and an open position. To remove the node from the deployment line, the node lock may need to be forcibly removed from the node. Various manual and/or automatic methods may be used to apply a predetermined force to the node lock to break weak latch portion 222b. Thus, in some situations, the deployment line and/or node locks may be safely removed and/or de-coupled from the seismic node.

Figure 2E:
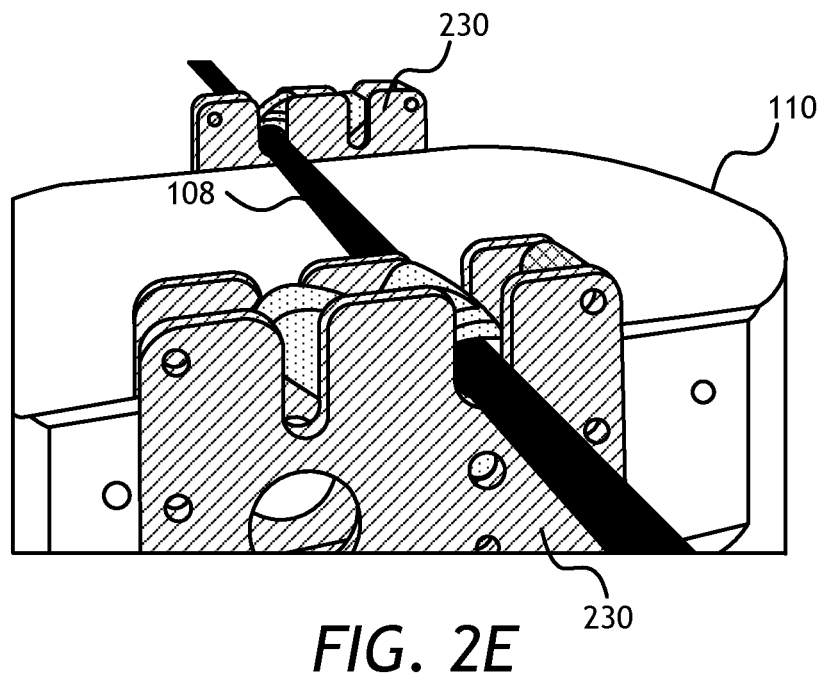
FIG. 2E is a perspective view diagram illustrating one embodiment of a direct attachment mechanism in the locked position.
Figure 2F:
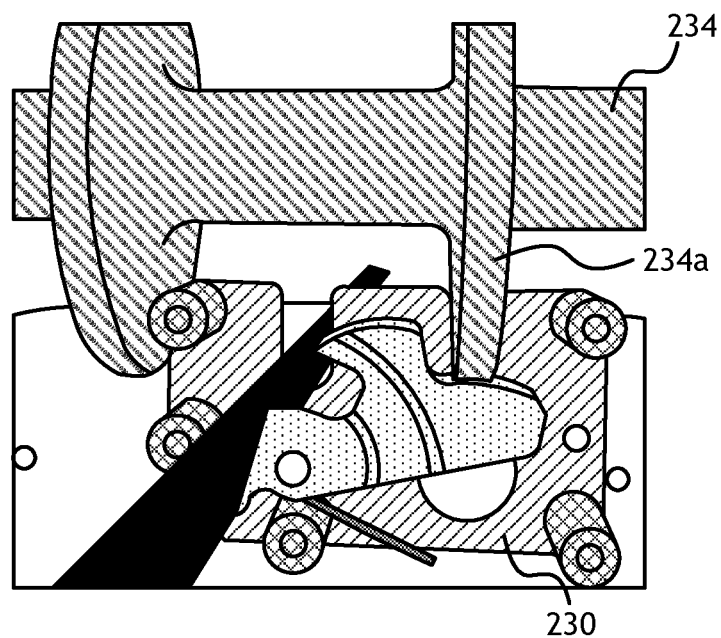
FIG. 2F is a side view diagram illustrating one embodiment of the direct attachment mechanism of FIG. 2E with a detachment tool.

FIGS. 2E and 2F illustrate one embodiment of node lock 230 coupled to a deployment line 108 and node 110. In one embodiment, node lock 230 may be substantially similar to node lock 220 as described in FIGS. 2C and 2D. Node lock 230 may be a snap on type of attachment mechanism. In an open position, lock 230 is configured to receive and/or release a deployment line 108 from node lock 230 and therefore node 110. Similarly, in a closed position, lock 230 is configured to hold and/or secure a deployment line 108 to node lock 230 and therefore node 110. As shown in FIG. 2E, node 110 may have a plurality of node locks 230. Node lock 230 is shown in a closed and/or locked position in FIG. 2E and in an open and/or unlocked position in FIG. 2F. In one embodiment, node lock 230 remains in a locked position by a spring or other biasing mechanism unless actuated and/or specifically opened. In one embodiment, node lock 230 may be actuated from a closed position to an open position by a locking/unlocking tool or mechanism 234, which may be a roller in one embodiment. Roller 234 may depress a portion of the node lock (such as latch portion 222a) to move the lock into an open position. The roller may comprise one or more flanges or protrusions 234a that may slide along one or more guides or channels on the node and/or node locks and may be used to restrain the deployment line during coupling to the node lock and to actuate and/or depress the node lock to move it into an open position. In one embodiment, the roller is designed with a double flange to contact and depress the locks on either side of the node irrespective of the direction of travel of the node. In other embodiments, attachment/detachment tool 234 may be a flat steel bar, rod, or fork that may be used manually or automatically to push the lock open. To remove the deployment line from the node lock, when the node lock is in an open position either the node or deployment line may be moved in a direction such that the deployment line is positioned away from the node lock. In still other embodiments, rather than using an attachment/detachment tool, the wire can be physically forced into the attachment mechanism (such as by pushing) for locking the deployment line to the node lock and physically forced out of the attachment mechanism (such as by pulling) for unlocking the deployment line from the node lock.

The direct attachment apparatuses and methods described herein provide numerous benefits over conventional node attachment and deployment techniques. The described node attachment locking device allows the node to be suspended underneath the deployment cable and when it lands on the seafloor provides better coupling between the seabed and node as it enables a higher probability of horizontal landing and/or orientation on the seabed. Prior art node attachment techniques gave poor seabed coupling, making the acquired seismic data not as reliable, noisy, and/or useful for acquiring directional data. The direct attachment mechanism does not tangle or get twisted with the deployment line or the coupling rope as in the prior node attachment methods. The disclosed embodiment also provides for high-speed, autonomous attachment and detachment to the deployment line and deployment and retrieval of the nodes/line to the sea and seabed with limited operator involvement. The disclosed node attachment device also provides many other benefits, such as acoustic decoupling of the node to the deployment line, easier cleaning of the node lock device, the ability to easily change the spacing/intervals between nodes on the deployment line, and the ability to freely rotate around the deployment line. The free rotation of the node around the deployment line decreases the likelihood that the node will rest on its side, a problem that often occurs with other attachment systems and nodes. Still further, through the offset center of gravity underneath the deployment line the node typically travels in the correct orientation to sit on the seafloor. In the rare occurrence that the node lands upside down, the node locks may act as coupling points to the seafloor making the node equally functional as if it was deployed in the correct orientation. Thus, the node can land on either the top or bottom face and still achieve a good seabed coupling. Further, the direct attachment mechanisms provides a significant advantage over existing nodes and node deployment techniques by providing the ability to change quickly the distance/spacing between the nodes on the deployment line without having to rebuild all or parts of the deployment line.

Figure 3A:
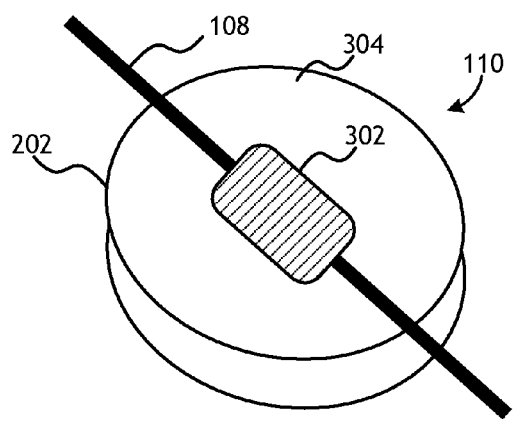
FIG. 3A is a perspective view diagram illustrating one embodiment of a direct attachment mechanism for marine deployment of a seismic node.
Figure 3B:
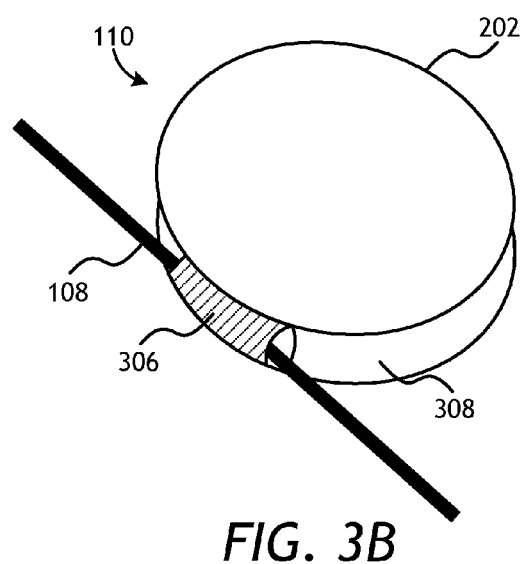
FIG. 3B is a perspective view diagram illustrating another embodiment of a direct attachment mechanism for marine deployment of a seismic node.
Figure 3C:
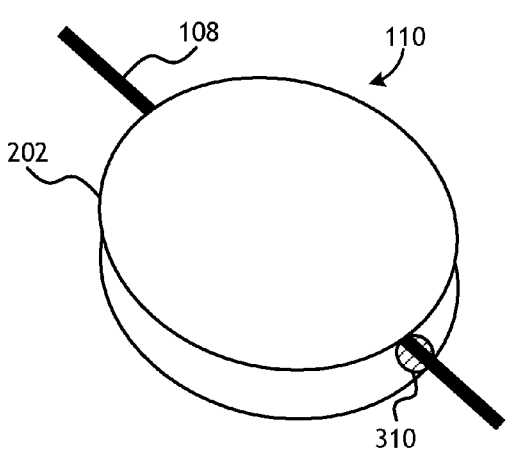
FIG. 3C is a perspective view diagram illustrating another embodiment of a direct attachment mechanism for marine deployment of a seismic node.
Figure 3D:
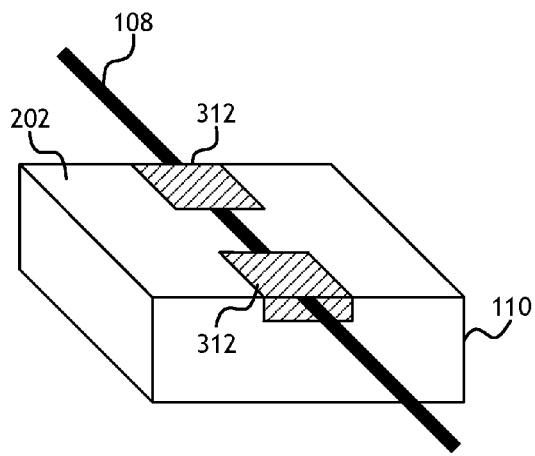
FIG. 3D is a perspective view diagram illustrating another embodiment of a direct attachment mechanism for marine deployment of a seismic node.
Figure 3E:
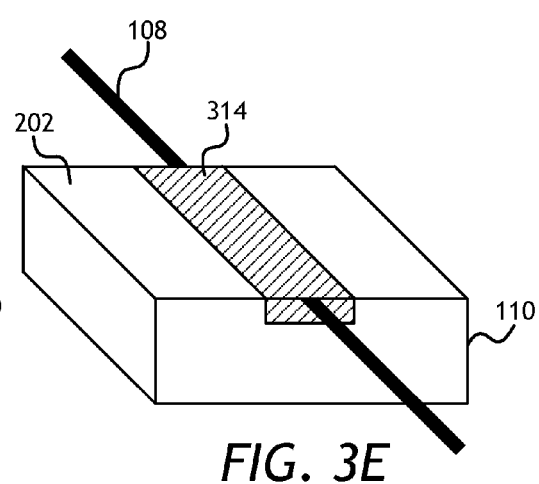
FIG. 3E is a perspective view diagram illustrating another embodiment of a direct attachment mechanism for marine deployment of a seismic node.
Figure 3F:
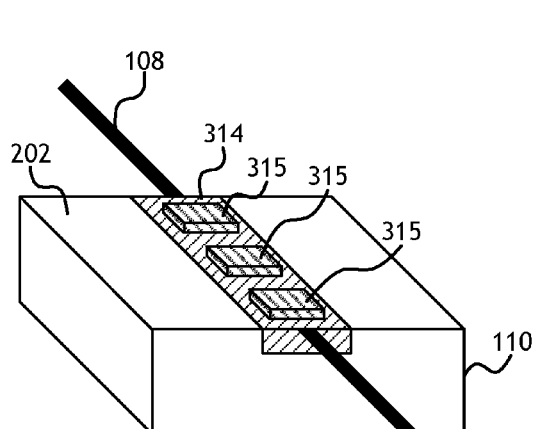
FIG. 3F is a perspective view diagram illustrating another embodiment of a direct attachment mechanism for marine deployment of a seismic node.
Figure 3G:
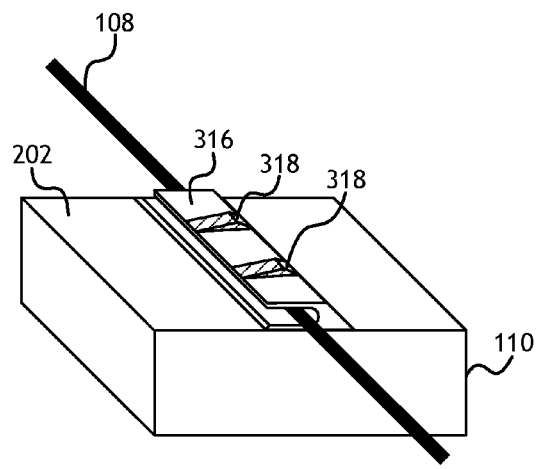
FIG. 3G is a perspective view diagram illustrating another embodiment of a direct attachment mechanism for marine deployment of a seismic node.

FIGS. 3A-G illustrate embodiments of positions where an attachment mechanism may be used for attaching the seismic node 110 to the deployment line 108. For simplicity purposes, any external non-pressure housing/bumper/fender to the pressure housing of node 110 is not shown, for the reason that any node locks and/or attachment mechanisms may be coupled to either or both of the pressure housing and non-pressure housing of the node. In FIG. 3A, an end attachment mechanism 302 may attach the deployment line 108 to a face or end surface 304 of the seismic node 110. An end face or surface 304 may be located on the top of the body 202 of the seismic node 110. In an alternative embodiment, the end face or surface 304 may be located on the bottom of the body 202 of the seismic node 110. One of ordinary skill will recognize that an end surface 304 may not necessarily be a top or bottom of the seismic node 110, depending upon the orientation and shape of the body 202 of the seismic node 110. Further, a plurality of end attachment mechanisms (such as two) may be used on an end face 304, such as shown in FIG. 3D. As illustrated in FIG. 3B, a side attachment mechanism 306 may attach the deployment line 108 to a side surface 308 of the seismic node 110. The side surface 308 may be curved in one embodiment. Alternatively, the side surface 308 may be substantially straight or planar, depending upon the shape and configuration of the seismic node 110. If the node is substantially square or rectangular (as shown in FIG. 2B and FIGS. 3D-3G), the node may have four substantially planar side surfaces 308. Further, a plurality of side attachment mechanisms (such as two) may be used on a side face 308. FIG. 3C illustrates an embodiment of a center attachment mechanism 310. The center attachment mechanism 310 may attach the deployment line 108 through a center portion of the seismic node 110 or through center portions on each end of a node. Although the center portion may fall directly along a central axis of the seismic node 110, one of ordinary skill will recognize that the center attachment mechanism 310 may be off center, but still contained within a central portion of the body 202 of the seismic node 110. FIG. 3D illustrates an embodiment of a plurality of attachment mechanisms and/or node locks 312 on a top face of the node 110. Locks 312 may be flush to one or more surfaces of the node 110 and are configured to hold deployment line 108. FIG. 3E illustrates an embodiment of a direct attachment mechanism with an attachment plate 314 that is coupled to the top center portion of node 110 and may extend substantially the length of a top face of node 110. Plate 314 may be recessed within a surface of the node such that it sits substantially flush with such surface. Attachment plate 314 may be directly connected to deployment line 108 or may comprise a plurality of node locks (shown in FIG. 3F) that are coupled to attachment plate 314 that can be directly connected to the deployment line. In FIG. 3F, node locks 315 are coupled to attachment plate 314 and may extend and/or protrude from plate 314 and/or be recessed within plate 314. FIG. 3G illustrates another embodiment of an attachment mechanism 316 that sits on the top center portion of node 110. Attachment mechanism 316 may comprise a grooved or slotted protrusion or lateral hook that extends substantially the length of a top face of node 110 and is configured to couple to a length of deployment line 108. In some embodiments, a plurality of retaining members or node locks 318 may be coupled to attachment mechanism 316 and configured to secure, retain, and/or lock the deployment line to attachment mechanism 316. Node locks and/or retaining members 318 may be part of and/or coupled to attachment mechanism 316. In one embodiment, node locks 318 protrude from an upper surface of attachment mechanism 316, and in other embodiments node locks 318 sit within attachment mechanism 318 such than an upper portion of attachment mechanism 316 is substantially flat.

Figure 3H:
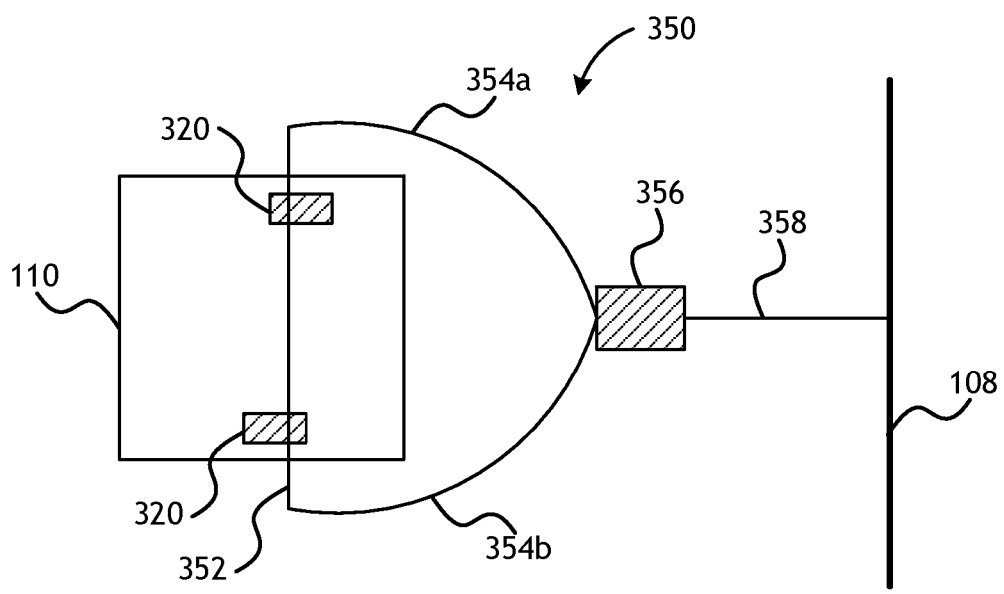
FIG. 3H is a schematic diagram illustrating one embodiment of a direct attachment mechanism coupled to a short locking rope attached to an un-tensioned deployment line.

FIG. 3H illustrates one embodiment of a node lock and/or direct attachment mechanism coupled to a weighted locking rope that is used to attach to a loosely deployed (e.g., un-tensioned) deployment line 108. In some embodiments, a node 110 may be directly coupled to a deployment line 108 via a node lock and/or direct attachment mechanism, for example as shown in FIGS. 3A-3G. In other embodiments, as shown in FIG. 3H, a locking rope system 350 may be attached to one or more node locks 320 on an autonomous seismic node. In one embodiment, node locks 320 may be substantially similar to node locks 220. Locking rope system 350 may be separately connected to deployment line 108 such that the arrangement is loosely coupled to the deployment line 108. Thus, the node may be connected to the deployment line in an offset manner via a separate cable interface system 350. This type of rope system may be advantageous in certain situations where ringing data and/or resonance (e.g., noise pick-up from the deployment line) is an issue, to avoid a node being trapped under the deployment line, when different depths of the node are desired, and/or when selective placement of the nodes can be done manually (typically with a limited number of nodes). In one embodiment, the locking rope system 350 comprises a first portion 352 that may be arranged to fit and be retained by node locks 320. First cable portion 352 may be a stiff or rigid rod. In one embodiment, first portion 352 is comprised of and/or coupled to linked segments 354a and 354b, each of which may be an insulated flexible or stiff linkage or segment, and that is able to pivot around the axis defined by first cable portion 352. In other embodiments, a stiff component is used for cable portions 354a and 354b and the node is coupled to an offset to allow the loosely/un-tensioned deployment line to settle on the seafloor to the side of the node, rather than being draped on the node causing noise. Either one of segments 354a or 354b may be omitted to make a single ended component that connects through one or more of node locks 320 if a stiff material is used that maintains its shape, such as that illustrated by 354a or 354b. Second portions 354a and 354b may extend from each end of first cable portion 352 and be connected at junction connector 356 which provides a large mass to decouple and isolate node 110 from cable 108, as well as connecting segments 354a and 354b if configured as two parts or segment 354a or 354b if configured as a single attachment element. The block and/or junction connector 356 is in addition used to combine or couple a plurality of cables or stiff members 354a and 354b into a single cable or stiff linear offset bar 358. In some embodiments a loose cable 358 can be connected to deployment line 108 and in other embodiments junction connector 356 is directly connected to deployment line 108 using an offset stiff bar 358. Cable 358 may be flexible or soft, semi-rigid, or rigid. Locking rope system 350 may also be coupled to other mechanisms besides deployment line 108, such as a rope or line attached to a surface or subsurface buoy to block 356 or cable 358.

Figure 3I:
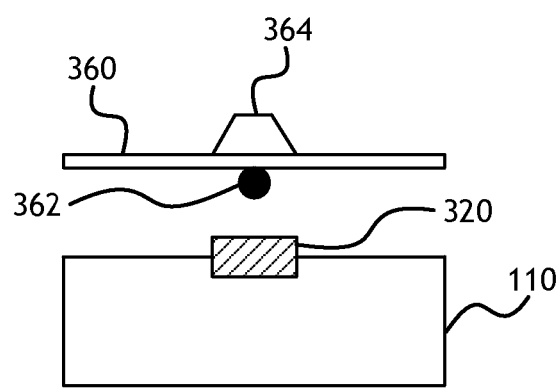
FIG. 3I is a schematic diagram illustrating one embodiment of a direct attachment mechanism coupled to a locking plate.
Figure 3J:
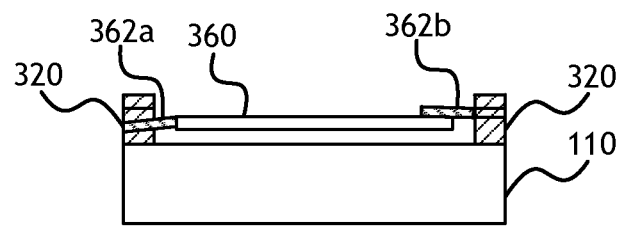
FIG. 3J is a schematic diagram illustrating another embodiment of a direct attachment mechanism coupled to a locking plate.

FIG. 3I is a schematic diagram illustrating one embodiment of a direct attachment mechanism coupled to an attachment or locking plate. In some embodiments, a node 110 may be directly coupled to a deployment line 108 via a node lock and/or direct attachment mechanism, for example as shown in FIGS. 3A-3G. In other embodiments, such as shown in FIG. 3I, the node lock is configured to receive a wide variety of other structures, such as T-bars, fishtails, rods, shafts, pins, and other cylindrical and non-cylindrical objects. Thus, a node may be coupled to a wide variety of structures by coupling an object to one or more node locks on the node. For example, a suction plate or other locking plate 360 may be coupled to one or more rods or T-bars 362, which are sized to fit and be retained within node locks 320. The locking plate 360 may also include one or more attachment mechanisms 364 for interfacing with another tool, machine, or system, such as an ROV; in other embodiments an ROV or other tool may directly couple to locking plate 360 without attachment mechanism 364. In some embodiments, the attachment mechanism may be a suction cup and/or other ROV attachment tool that is configured to couple with an ROV during seabed operations. In conventional ROV techniques, an ROV may deploy and recover autonomous seismic nodes to and from the seabed, and conventional techniques use a suction device on an ROV robotic arm that suctions a surface of the node to move the node during subsea operations. Such a conventional suction device and/or method may not work under all seabed circumstances, nodes, and/or ROVs, and the disclosed embodiments provides a mechanism for an easily configurable locking plate that can be used for a wide variety of ROV operations. FIG. 3J is a schematic diagram illustrating another embodiment of a direct attachment mechanism coupled to an attachment or locking plate. The system described in FIG. 3J is substantially similar to that described in FIG. 3I. A plurality of rods or T-bars 362 are used to couple locking plate 360 to node locks 320 in a variety of configurations. For example, in one embodiment bar 362a may be coupled to the side of locking plate 360 and in another embodiment bar 362b may be coupled to the top of locking plate 360. Bars 362 may be depressed and/or pushed into locks 320 for attachment of plate 360 to node 110. Based on this configuration, the locking plate 360 of FIG. 3J sits substantially flush to the node locks 320 when in a locked position as compared to the locking plate 360 of FIG. 3I that may extend above the height of node locks 320.

Figure 3K:
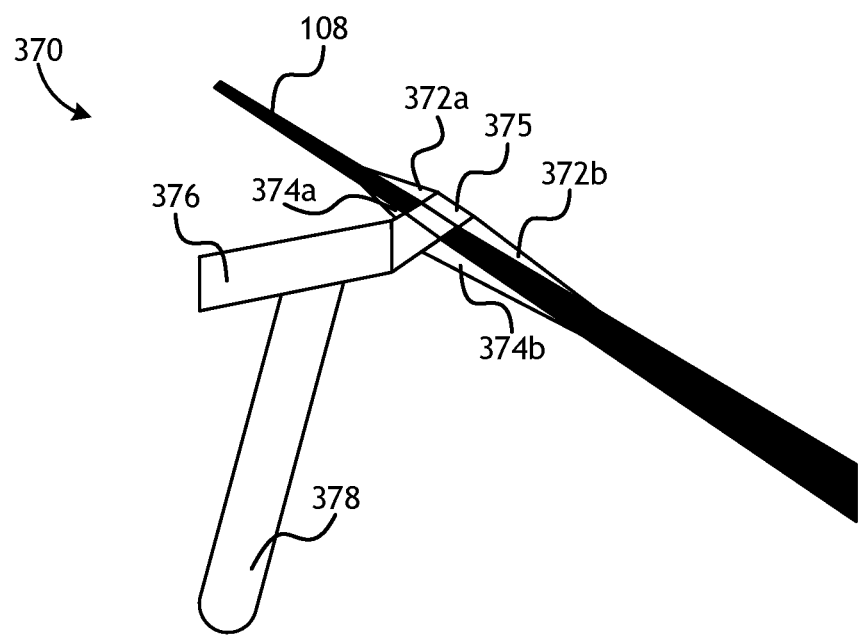
FIG. 3K is a perspective view diagram illustrating a hooking attachment mechanism directly attached to a deployment line for marine deployment of a seismic node.

FIG. 3K is a schematic diagram showing a direct hook attachment system. In one embodiment, a plurality of passenger hooks are coupled to a bare steel conveyor wire (e.g., a deployment line), similar to a Poma type system for ski lifts, such as that disclosed in U.S. Pat. Nos. 4,741,272 and 5,520,116, incorporated herein by reference. The hooks are stored in a First In Last Out (FILO) type buffer cassette next to the deployment line and are directly attached to the deployment line at intermittent or predetermined spacing, either manually or automatically. In one embodiment, each hook has a spring-loaded lock that grabs onto the wire when released from the cassette. The release mechanism on the hook holds the lock until time of release. The use of such hooking attachment mechanisms is efficient, fast, and flexible. One or more hooks may be attached to various portions of the node, such as one or more sides of the node and/or the top surface/face of the node. Thus, the node may be directly attached to the deployment cable by the hook. Further, the node may comprise one or more node locks that are each directly attached to the hook. In one embodiment, a locking hook system 370 comprises a first member 376 that is coupled to a deployment line via one or more fastening mechanisms. In one embodiment, the fastening mechanism comprises an upper portion 372a and 372b and a lower portion 374a and 374a and is configured to move between an open and closed position via release mechanism and/or hinge 375. In one embodiment, fastening mechanism locks onto upper and lower portions of a length of deployment line. Locking hook system 370 also comprises a second member 378 that is configured to engage with or couple to the node and/or node locks on the node. Other configurations of this type of hooking arrangement are feasible that may not utilize a hook, such as any other latching or clamping device or lever that can directly couple to the deployment line and be separately coupled to the node and/or node lock.

Various additional embodiments of direct attachment mechanisms are described in FIGS. 4-28, and one of ordinary skill will recognize that the described embodiments may be adapted for use as an end attachment mechanism 302, a side attachment mechanism 306, a top attachment mechanism 312, 314, or 316, or a center attachment mechanism 310 according to the configuration of the deployment system. While they all describe specific embodiments of a node lock and/or direct attachment mechanism with different advantages and disadvantages, the intended function and benefits of the nodes locks are largely the same. That is, the described node locks allow direct connection of a node to a deployment line for enhanced deployment, recovery, and placement of the node to the seabed floor. Likewise, direct attachment mechanisms may be placed on one or more corners of the node. Further, while a direct attachment mechanism may be placed on an end, side, or center position of the node, it can also be attached to similar positions of a node housing, such as that shown in FIG. 2B. Still further, while many of the nodes shown in the described figures are circular in shape, the node and/or node housing may be any number of shapes and/or geometric configurations, as described above. Further, any node lock and/or attachment mechanism may be directly connected to the pressure house and/or to the node housing/fender surrounding the pressure housing. Still further, any node lock and/or attachment mechanism may be actuated from a closed position to an open position by the use of a detachment/attachment tool and/or simply brute force (such as by pushing or pulling the deployment line into engagement with the node lock).

Figure 4A:
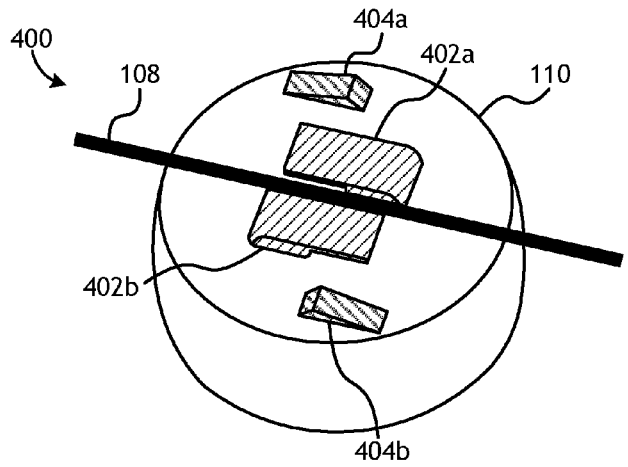
FIG. 4A is a perspective view diagram illustrating one embodiment of a direct attachment mechanism for deployment of a seismic node.
Figure 4B:
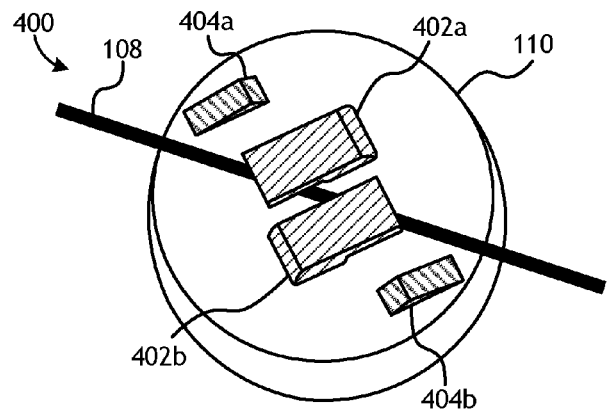
FIG. 4B is a perspective view diagram illustrating one embodiment of the direct attachment mechanism of FIG. 4A during attachment.
Figure 4C:
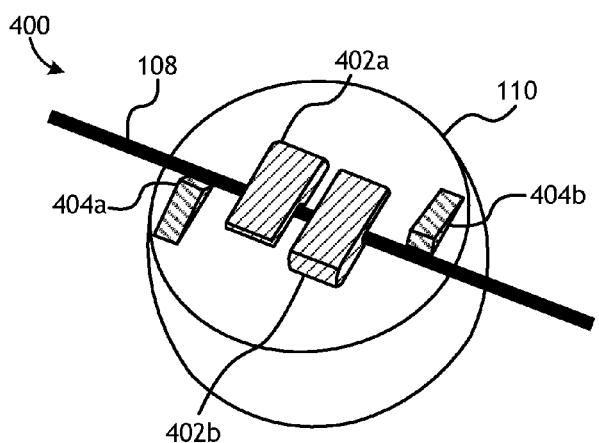
FIG. 4C is a perspective view diagram illustrating one embodiment of the direct attachment mechanism of FIG. 4A after attachment.

FIG. 4A is a perspective view diagram illustrating one embodiment of a bend-wire attachment mechanism 400 for deployment of a seismic node 110. In an embodiment, the bend-wire attachment mechanism 400 may include a plurality of retaining members or hooks 402a-b on the face of a node configured to catch and retain the deployment line 108 in proximity to the seismic node 110. In an embodiment, the hooks 402a-b may each have a flange portion configured to receive the deployment line 108. An opening of the flange portion may be oriented in opposing directions for laterally retaining the deployment line. In an embodiment, the bend-wire attachment mechanism 400 may also include one or more protrusions, ridges, or bumps 404a-b configured to restrict torsional motion of the deployment line 108 relative to the seismic node 110. In such an embodiment, the bumps 404a-b may prevent the seismic node 110 from unintentionally coming free of the deployment line 108 and thus further acts as a locking mechanism. The bumps 404a-b may have a gradual slope on one side and a steep slope on the other side or any number of configurations to help retain or otherwise secure the line 108 to the attachment mechanism. In such an embodiment, the magnitude of a force required to remove the seismic node 110 from the deployment line 108 may be greater than a force required to attach the seismic node 110 to the deployment line 108. The bumps may be made from stainless steel, titanium, or other non-corrosive metal. Other material that may be used may be carbon fiber or glass reinforced resin, or molded or machined high-density plastics or synthetic material such as PEEK. In another embodiment, each of the bumps may further comprise grooves or notches (not shown) that further lock the deployment line to the attachment mechanism. The bumps and hooks are sized for the particular type and size of deployment line being used. FIG. 4B is a perspective view diagram illustrating one embodiment of the bend-wire attachment mechanism 400 of FIG. 4A during attachment to the deployment line 108. In such an embodiment the deployment line 108 may be initially positioned in a space between the hooks 402a-b, and the seismic node 110 may be rotated to fully engage the hooks 402a-b and the bumps 404a-b with the deployment line 108 as shown in FIG. 4C. In one embodiment, the locking portion of bumps 404a-b (e.g., the steep sloped slide) may be substantially aligned with the inside opening of the flange portion of hooks 402a-b, such that when the line 108 is locked to attachment mechanism 400 the deployment line is secured in a substantially straight path along the central axis of an upper top face of node 110, as shown in FIG. 4C.

Figure 5A:
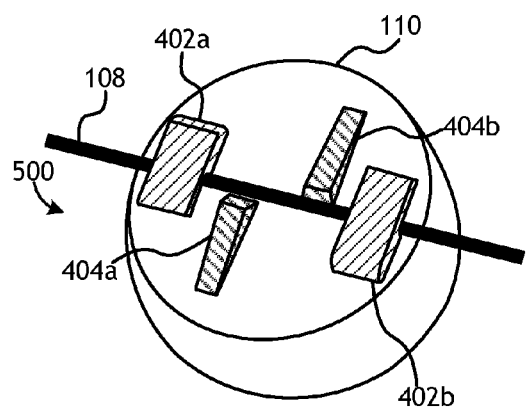
FIG. 5A is a perspective view diagram illustrating another embodiment of a direct attachment mechanism for marine deployment of a seismic node.
Figure 5B:
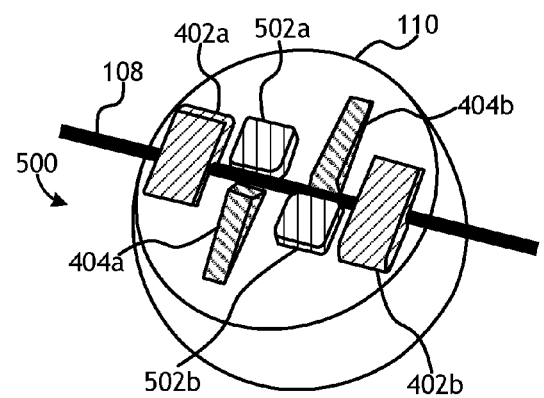
FIG. 5B is a perspective view diagram illustrating another embodiment of a direct attachment mechanism for marine deployment of a seismic node.
Figure 5C:
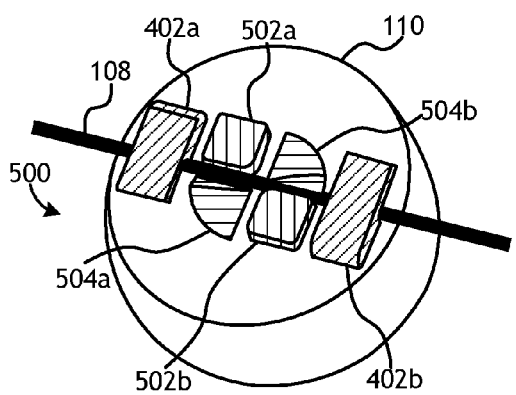
FIG. 5C is a perspective view diagram illustrating another embodiment of a direct attachment mechanism for marine deployment of a seismic node.

FIGS. 5A-5C illustrate other embodiments of bend-wire attachment mechanisms 500, which may be attached to a face of the node. In FIG. 5A, while the location of the bumps 404a-b is swapped with the hooks 402a-b from the positions shown in FIG. 4A, each component operates in substantially the same way. In the embodiment of FIG. 5B, additional guide blocks 502a-b provide additional lateral support and additional locking strength for retention of the deployment line 108 to the seismic node 110. Guide blocks 502a-b may consist of any number of geometric shapes and/or configurations, and in one embodiment is substantially square shaped. In the embodiment of FIG. 5C, bumps 404a-b are replaced with torsional bumps 504a-b to provide easier attachment of the seismic node 110 to the deployment line 108. Torsional bumps 504a-b may consist of any number of geometric shapes and/or configurations, and may be in the shape of a quarter circle with a sloping planar surface. The operation of bend-wire attachment mechanisms 500 work similarly to the operation of bend-wire attachment mechanism 400.

FIGS. 6A-E illustrate an embodiment of a rotating turret attachment mechanism 600, which may be attached to the face of the node. The rotating turret mechanism 600 may comprise a rotating turret 602 that has a slot 606 for receiving the deployment line. The rotating turret 602 may consist of any number of geometric shapes and/or configurations, and in one embodiment may be substantially circular in shape. Additionally, the turret may comprise a cavity or guide 604 that is configured to receive the deployment line 108 as illustrated in FIG. 6B. The turret may comprise a circular base that is mounted on the node, a stationary portion that comprises guide 604, and an upper rotating plate. In an embodiment, the guide 604 may remain stationary relative to the orientation of the seismic node 110, but a portion of the rotating turret 602 (such as the upper rotating plate) may rotate as illustrated in FIG. 6C approximately 90 degrees from an open position to a closed position. In such an embodiment, the rotating turret 602 may retain the deployment line 108 in position relative to the guide 604 when rotated into a locked position as shown in FIG. 6D. FIG. 6E illustrates a cross-section showing the rotating turret 602 in a locked position and the deployment line 108 secured into the guide 604 by the rotating turret 602 in a closed position. Although the lock is shown centrally placed in the seismic node 110, two or more turrets could be placed on the seismic node 110 to restrain the deployment line 108.

Figure 7A:
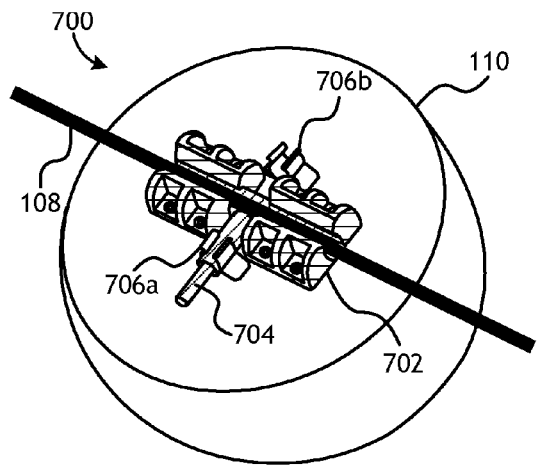
FIG. 7A is a perspective view diagram illustrating one embodiment of a direct attachment mechanism for deployment of a seismic node.
Figure 7B:
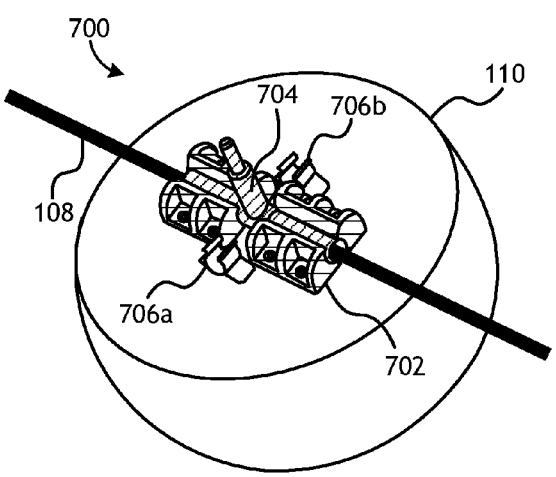
FIG. 7B is a perspective view diagram illustrating one embodiment of the direct attachment mechanism of FIG. 7A during attachment.
Figure 7C:
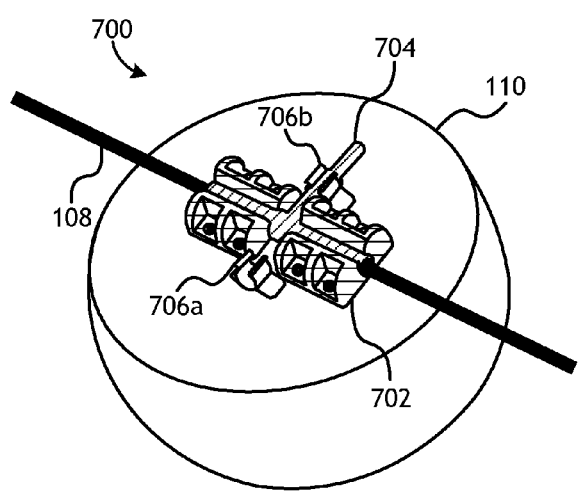
FIG. 7C is a perspective view diagram illustrating one embodiment of the direct attachment mechanism of FIG. 7A after attachment.
Figure 7D:
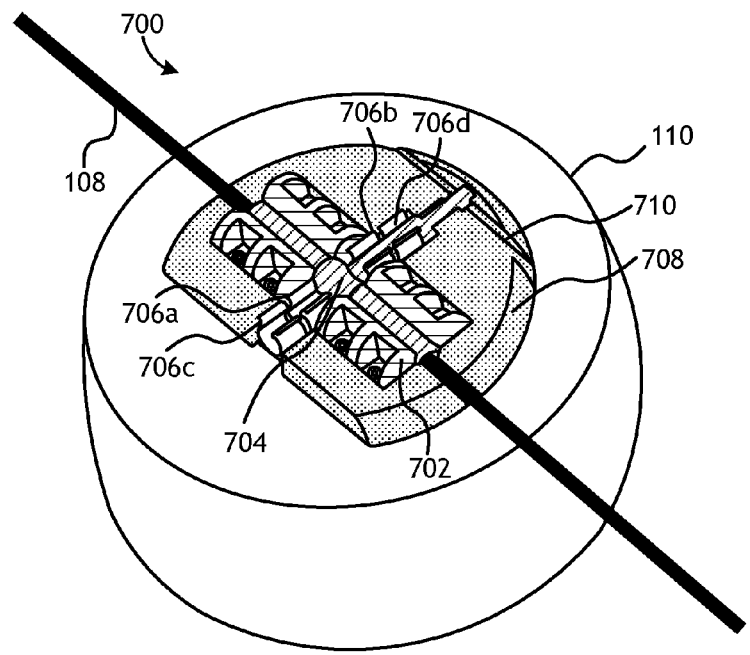
FIG. 7D is a perspective view diagram illustrating another embodiment of the direct attachment mechanism of FIG. 7A.
Figure 7E:
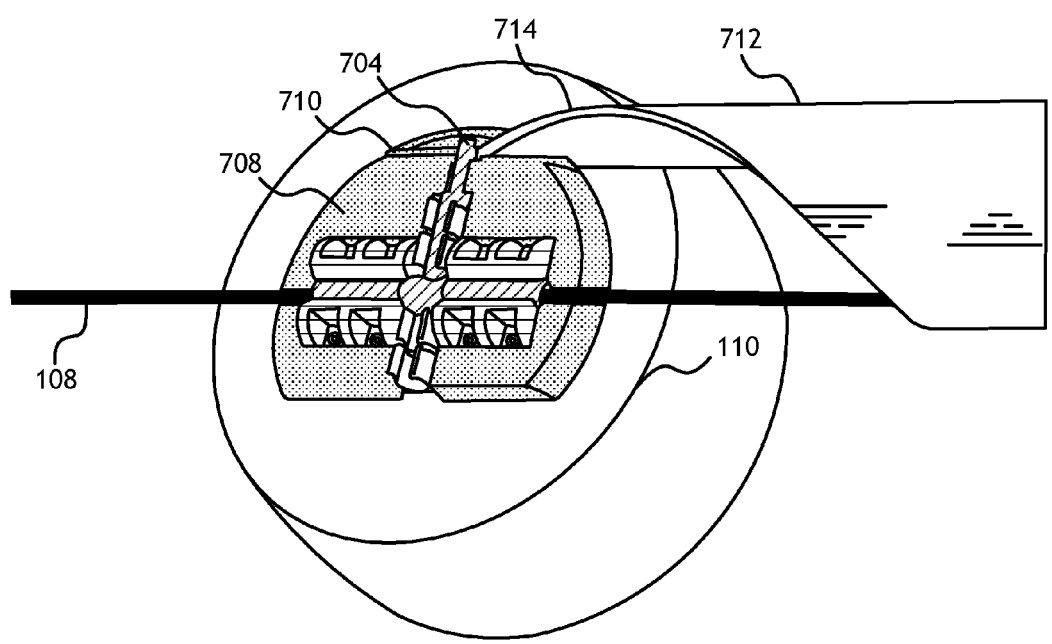
FIG. 7E is a perspective view diagram illustrating one embodiment of a detachment tool for detachment of a seismic node.

FIGS. 7A-E illustrate one embodiment of a flip-lock attachment mechanism 700, which may be attached to a face of the node. There may be one or more locks installed on node 110, although for convenience only the action of a single lock has been described. In an embodiment, the flip-lock attachment mechanism 700 includes a line guide 702 and is moveable between a closed position and an open position. The line guide 702 may be connected to a rotatable flip-lock 704. The flip lock 704 may be configured to rotate about an axis of the line guide 702. In an embodiment, the flip-lock 704 may include a sleeve with an extension. In an open position, the sleeve may receive the deployment line 108. In the closed position, the sleeve may retain the deployment line 108 to the body of the seismic node 110 as shown in FIG. 7C. The flip-lock 704 may rotate about the axis from the open position to the closed position. In an embodiment, the flip-lock 704 may be held in position by one or more retention members 706a-b. In an embodiment, the retention member 706a-b may be a retention clip. One of ordinary skill will recognize alternative embodiments of retention members 706 which may be used with the embodiment of FIGS. 7A-E. For example, additional retention members 706c-d may be included, as shown in FIG. 7D. In the embodiments of FIGS. 7D-E, a detachment plate 708 may be coupled to the node to facilitate attachment and detachment of the deployment line to the node lock. Plate 708 may comprise a guide slot 710 for receiving a detachment tool 712 that may be part of and/or coupled to a node coupling machine. The detachment tool 712 (shown in FIG. 7E) may be configured to flip and/or open the flip-lock 704 from the closed position to the open position, thereby releasing the deployment line 108 from the lock and node. In an embodiment, the detachment tool 712 may include a leading edge 714 that is shaped to cause the flip-lock 704 to rotate about the deployment line 108 to the open position.

Figure 8A:
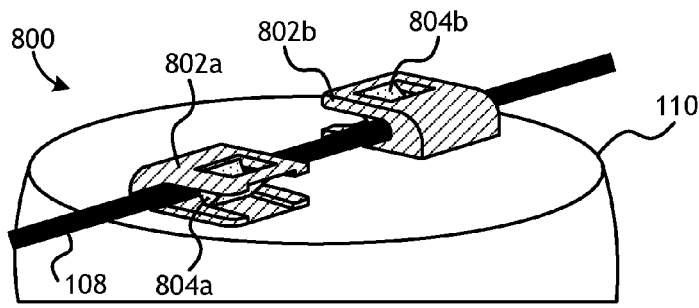
FIG. 8A is a perspective view diagram illustrating one embodiment of a direct attachment mechanism for deployment of a seismic node.
Figure 8B:
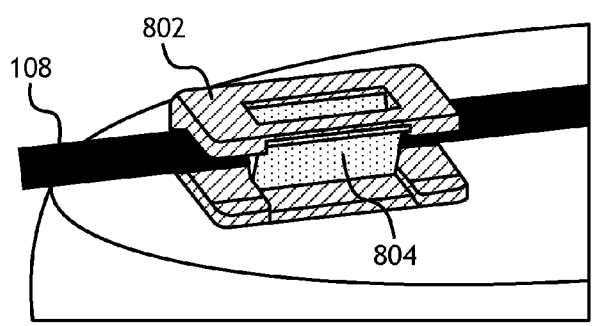
FIG. 8B is a perspective view of one embodiment of the direct attachment mechanism of FIG. 8A.
Figure 8C:
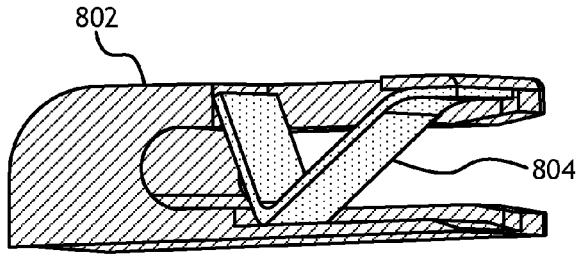
FIG. 8C is a partial cross-section view of one embodiment of the direct attachment mechanism of FIG. 8A.
Figure 8D:
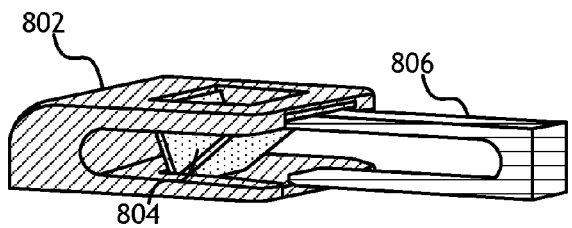
FIG. 8D is a partial perspective view of one embodiment of the direct attachment mechanism of FIG. 8A with a detachment tool.
Figure 8E:
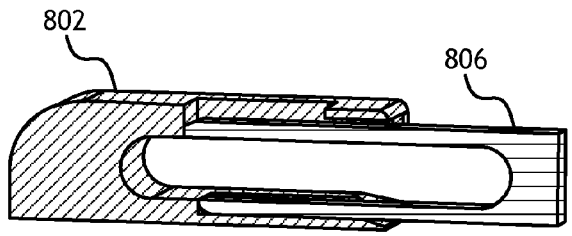
FIG. 8E is a partial perspective view of one embodiment of a detachment tool for detachment of a seismic node.

FIGS. 8A-E illustrate an embodiment of a flat-hook attachment mechanism 800, which may be attached to a face of the node. In an embodiment, the flat-hook attachment mechanism 800 may include two hook bodies 802a-b. The two hook bodies 802a-b may be oriented in opposing directions for enhanced lateral retention of the deployment line 108. The hook body is closed on one end for retaining the deployment line and open on the other end for receiving the deployment line. The upper and lower portions of the hook body are substantially flat. Each hook body 802a-b may be connected to a spring lock 804a-b. In an embodiment, the spring locks 804a-b may be a leaf spring as illustrated in FIGS. 8B-C. The spring locks 804a-b may be configured to allow easy attachment of the seismic node 110 to the deployment line 108 by rotating the seismic node 110 into place on the deployment line. For example, the spring locks 804a-b may include tapered surfaces allowing easy attachment. However, once attached it may be more difficult to remove the seismic node 110 by the tapered surface and design of the spring lock. In such an embodiment, a detachment tool 806 may be used to open the spring locks 804a-b and release the deployment line 108 as illustrated in FIGS. 8D-E. Detachment tool 806 may be in the shape of a clothespin and is configured for insertion into the hook body 802 to depress spring lock 804. Spring lock 804 is biased to be in a closed position unless actuated, such as by tool 806.

Figure 9A:
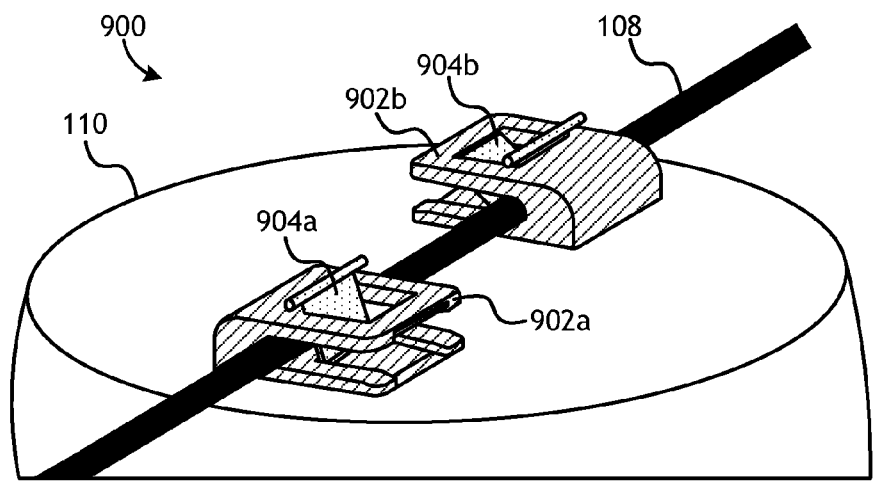
FIG. 9A is a perspective view diagram illustrating one embodiment of a direct attachment mechanism for deployment of a seismic node.
Figure 9B:
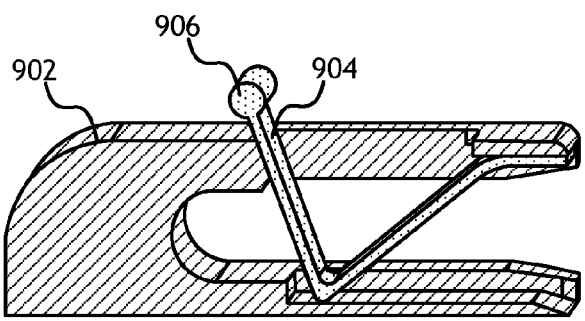
FIG. 9B is a partial cross-section view diagram of the direct attachment mechanism of FIG. 9A.
Figure 9C:
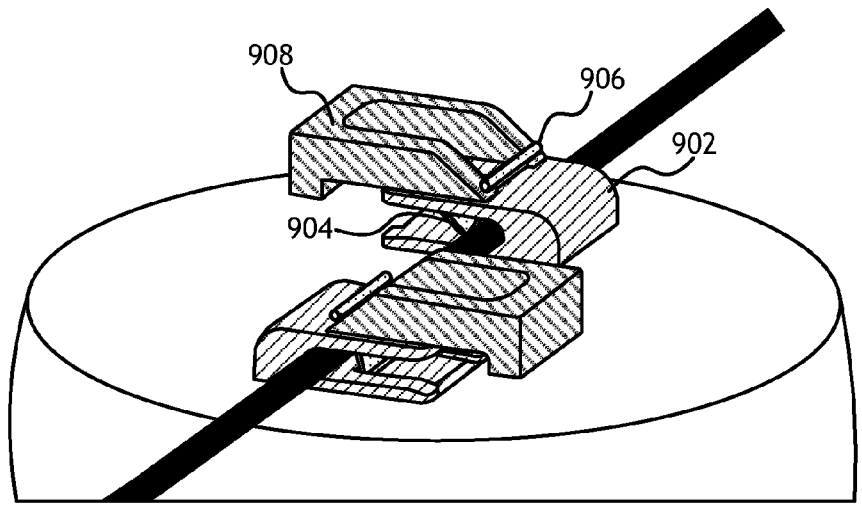
FIG. 9C is a perspective view diagram illustrating one embodiment of the direct attachment mechanism of FIG. 9A with a detachment tool for detachment of the seismic node.

FIGS. 9A-C illustrate another embodiment of a flat-hook attachment mechanism 900, which may be attached to a face of the node. In the embodiment of FIG. 9A, hook bodies 902a-b may be arranged similarly to the hook bodies 802a-b of FIG. 8A. In an embodiment, the spring locks 904a-b may include a flange 906 protruding from an outer surface of the hook bodies 902a-b as shown in FIG. 9B. The flange 906 may facilitate opening of the spring locks 904a-b by the detachment tool 908 illustrated in FIG. 9C. Detachment tool 908 may not interfere with the deployment line 108, and therefore may be preferable to the detachment tool 806 of FIGS. 8D-E. One of ordinary skill may recognize alternative embodiments of spring locks 904a-b, hook bodies 902a-b, or detachment tools 906 which may be suitable for use in various embodiments.

Figure 10A:
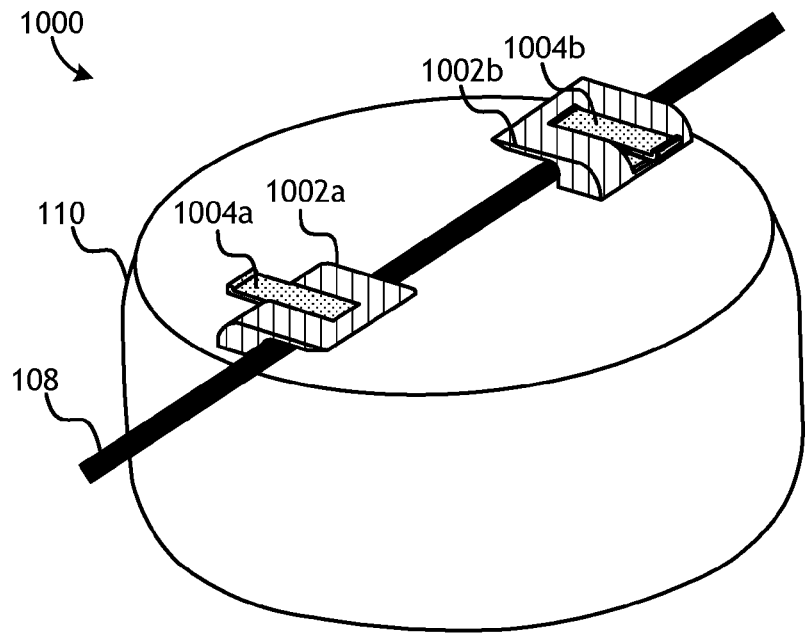
FIG. 10A is a perspective view diagram illustrating one embodiment of a direct attachment mechanism for deployment of a seismic node.
Figure 10B:
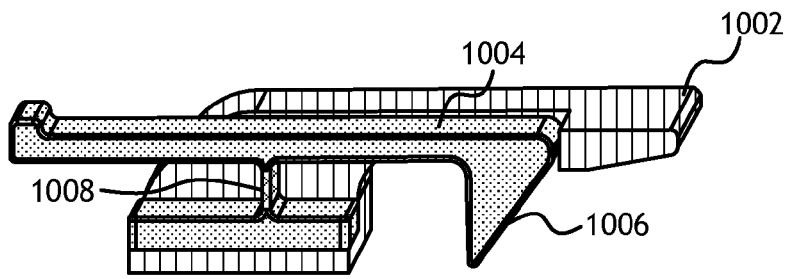
FIG. 10B is a partial cross-section view diagram illustrating one embodiment of the direct attachment mechanism of FIG. 10A.
Figure 10C:
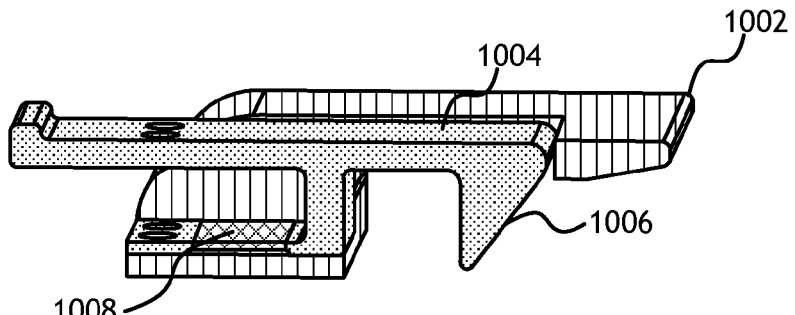
FIG. 10C is a partial cross-section view diagram illustrating another embodiment of the direct attachment mechanism of FIG. 10A.

FIGS. 10A-C illustrate an embodiment of a flex-lock attachment mechanism 1000, which may be attached to a face of the node. In an embodiment, the flex-lock attachment mechanism 1000 may include hook bodies 1002a-b. The hook bodies 1002a-b may be similar to the hook bodies 802a-b and 902a-b described with relation to FIGS. 8-9, but are recessed in grooves or cavities of the node such that the top portions of the hook bodies are substantially flush with a surface of the node. Additionally, the flex-lock attachment mechanism 1000 may include flex locks 1004a-b to secure the deployment line 108. The flex locks 1004a-b may be depressed on one end causing the opposing end to open allowing the deployment line 108 to be attached and detached from the seismic node 110. As shown in FIG. 10B, the flex lock 1004 may include a flange 1006 configured to secure the deployment line 108 when inserted into the attachment mechanism. Flange 1006 may be shaped such that the leading end is angled for easier receiving of the deployment line and the opposing or trailing end is substantially straight and/or perpendicular to the length of the deployment line to help retain the deployment line in the flex lock. The flex lock 1004 may also include a flexible portion 1008 configured to allow the flange 1006 to open and close relative to the hook 1002. FIG. 10C illustrates an alternative embodiment of the flexible portion 1008. In one embodiment, the flex lock 1004 may be actuated (e.g., depressed) causing the flexible portion 1008 to flex and allow the flange 1006 to open relative to the hook 1002 and be configured for receiving the deployment line.

Figure 11A:
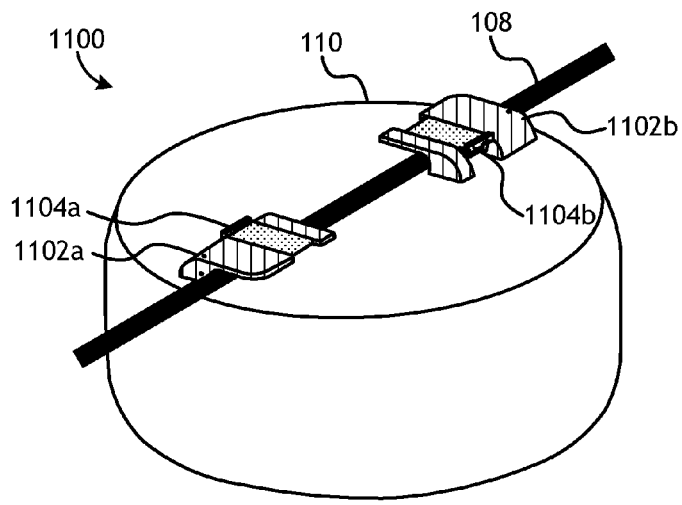
FIG. 11A is a perspective view diagram illustrating one embodiment of a direct attachment mechanism for deployment of a seismic node.
Figure 11B:
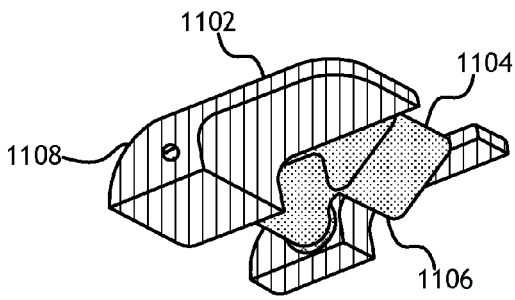
FIG. 11B is a partial perspective view diagram illustrating one embodiment of the direct attachment mechanism of FIG. 11A.
Figure 11C:
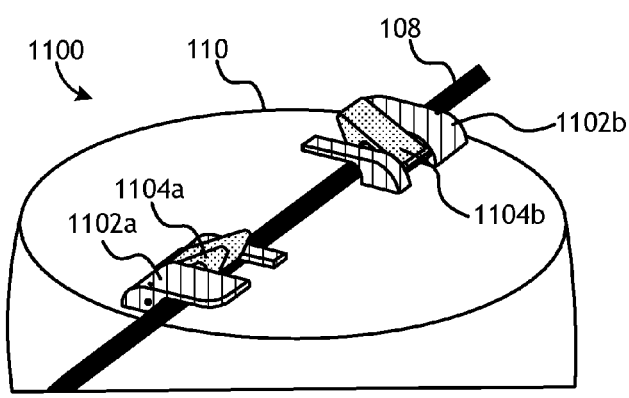
FIG. 11C is a perspective view diagram illustrating one embodiment of detachment of the direct attachment mechanism of FIG. 11A.
Figure 11D:
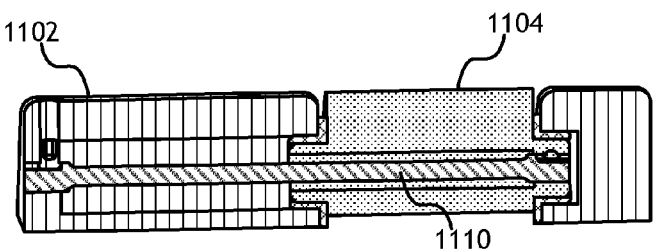
FIG. 11D is a partial cross-section view diagram illustrating one embodiment of the direct attachment mechanism of FIG. 11A.

FIGS. 11A-D illustrate embodiments of a torsion spring attachment mechanism 1100, which may be attached to a face of the node. In an embodiment, the torsion spring attachment mechanism 1100 may include hooks 1102a-b and torsion spring locks 1104a-b. FIG. 11A shows the lock in a closed position and FIG. 11B shows the lock in an open position. The torsion spring lock 1104 may rotate about an axis 1108 allowing the torsion spring lock 1104 to open and close as illustrated in FIGS. 11B-C. In a locked position, the torsion spring lock 1104 may be substantially flush with the surface of the node, and in an unlocked position may extend above the surface of the node as shown in FIG. 11C. Additionally, the torsion spring lock may include a flange 1106 configured to secure the deployment line 108. The torsion spring lock 1104 may also comprise a spring 1110 for moving the lock between a closed position and an open position. FIG. 11D illustrates a cross-section of the torsion spring attachment mechanism 1100. Torsion spring 1110 may be a torsion bar comprising a flexible material such as rubber. Various embodiments of a torsion bar may be made from galvanized steel rod, spring steel, etc. One of ordinary skill will recognize a variety of torsion springs 1110 that may be suitable for use with the present embodiments.

Figure 12A:
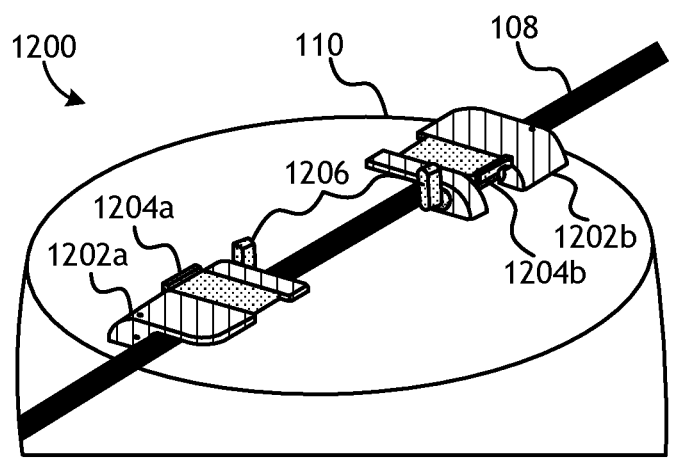
FIG. 12A is a perspective view diagram illustrating one embodiment of a direct attachment mechanism for deployment of a seismic node.
Figure 12B:
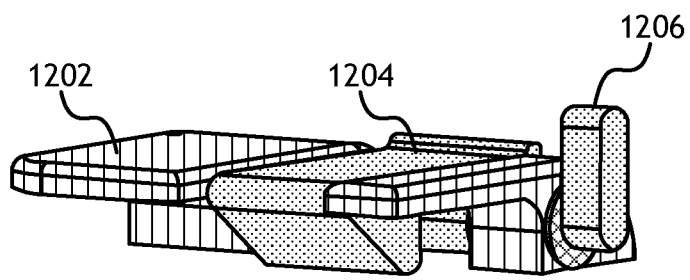
FIG. 12B is a partial perspective view diagram illustrating one embodiment of the direct attachment mechanism of FIG. 12A.

FIGS. 12A-B illustrate a further embodiment of the torsion spring attachment mechanism described in FIGS. 11A-D. In addition to the components described for torsion spring mechanism 1100, torsion spring attachment mechanism 1200 further comprises a detachment lever 1206. In an embodiment, the detachment lever 1206 may be configured to allow actuation of the torsion spring lock 1204 relative to the hook 1202 as shown in FIG. 12B. Actuation of the torsion spring lock 1204 may allow the seismic node 110 to be attached to and removed from the deployment line 108.

Figure 13A:
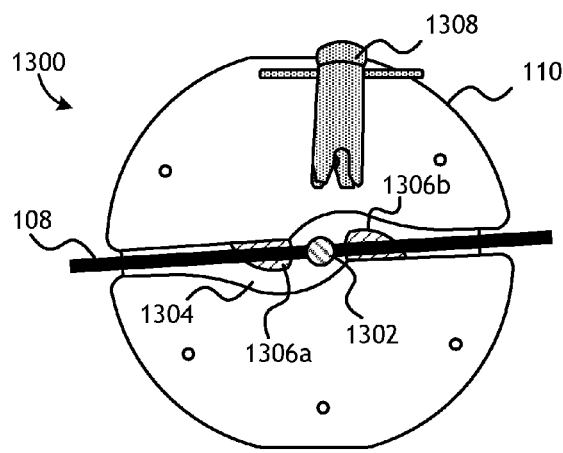
FIG. 13A is an end-view diagram illustrating one embodiment of a direct attachment mechanism and a side view diagram of an associated attachment/detachment tool.
Figure 13B:
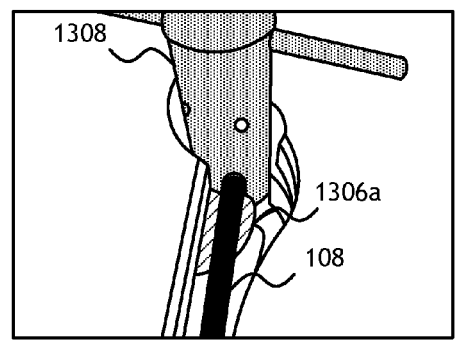
FIG. 13B is a partial perspective view diagram illustrating operation of the attachment/detachment tool with the direct attachment mechanism of FIG. 13A.
Figure 13C:
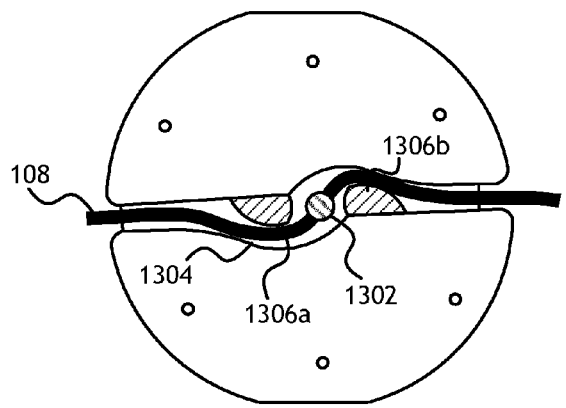
FIG. 13C is an end-view diagram illustrating operation of the direct attachment mechanism of FIG. 13A.
Figure 13D:
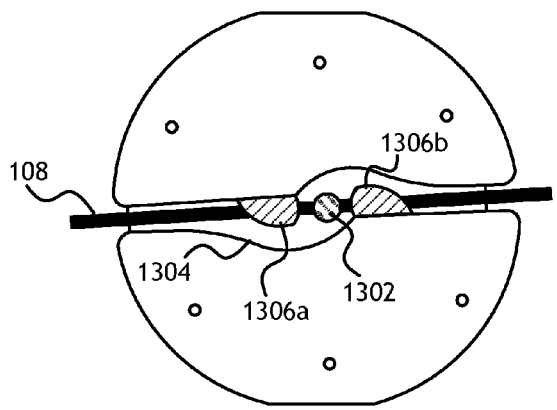
FIG. 13D is an end-view diagram illustrating one embodiment of the direct attachment mechanism of FIG. 13A after attachment.

FIGS. 13A-C illustrate an embodiment of a twist-in-place attachment mechanism 1300 and associated embodiment of an attachment/detachment tool 1308, which may be attached to a face and/or center portion of the node. 13A shows a deployment line next to (e.g., above) attachment mechanism 1300 before being retained by the attachment mechanism. FIG. 13C illustrates the deployment line in a channel 1304 of the node adjacent to the attachment mechanism 1300 and FIG. 13D illustrates the attachment mechanism in a locked and/or closed position with the deployment line being retained within attachment mechanism 1300. In this embodiment, the stiffness of the deployment line (preferably steel cable) is used as a torque spring and is used to retain the deployment line within attachment mechanism 1300. In one embodiment, the deployment line 108 may include a ferrule 1302 for retaining the seismic node 110 in a specific position on the deployment line 108, such as the mid-section of the seismic node 110. In one embodiment, the ferrule 1302 may be crimped or bolted to the deployment line 108. The attachment/detachment tool 1308 may include a portion configured to receive the ferrule 1302 as illustrated in FIG. 13B. In one embodiment, the tool 1308 is designed to grip onto the deployment line 108 when twisted about its center axis (such as in a counterclockwise rotation), and the tool 1308 is used to install the deployment line 108 into the attachment mechanism 1300 as well as to remove the deployment line 108 from said attachment mechanism. The tool 1308 uses the cylindrical area in the center of the seismic node 110 for guidance and coupling to the ferrule 1302 and/or deployment line 108. After attachment, the seismic node 110 is free to rotate about the deployment line 108 as the path through the seismic node 110 is dimensioned so that the deployment line 108 has clearance all around its circumference even when coupled to the node. In a further embodiment, the attachment/detachment tool 1308 is designed to twist the deployment line 108 into a spiral and/or curved shape. In one embodiment, the combined spiral shape of the deployment line 108 and shape of tool 1308 matches a corresponding shape in seismic node 110. In a further embodiment, the seismic node 110 may include a channel 1304 configured to receive the deployment line 108 into a central portion of the seismic node 110. The channel 1304 may include one or more restraining lugs or protrusions 1306a-b that further secure the deployment line 108 to seismic node 110.

In an embodiment, the attachment/detachment tool 1308 is used to depress the deployment line 108 into the channel 1304, as shown in FIG. 13B. The attachment/detachment tool 1308 may be rotated to twist the deployment line into a shape suitable for passing under the restraining lugs 1306a-b, as shown in FIG. 13C. The stiffness and/or resilience of the deployment line 108 may cause the deployment line 108 to straighten under the restraining lugs 1306a-b, thereby retaining the seismic node 110 to the deployment line 108, as shown in FIG. 13D. The attachment/detachment tool 1308 is removed by turning the tool in the opposite direction as that used for the installation until there is no torque applied to the deployment line 108 and the guide alignments of the tool are clear of the deployment line. The attachment/detachment tool 1308 can then be lifted vertically, leaving the deployment line 108 passing under the shaped restraining lugs 1306a-b with the seismic node 110 securely locked to the deployment line 108. The release (unlocking) of the seismic node 110 is achieved by reversing the above described sequence of events. In a further embodiment, the attachment mechanism 1300 may further include a spring mechanism (not shown) that grips the deployment line 108 and locks the seismic node 110 to the deployment line by pressing the deployment line 108 against the restraining lugs 1306a-b when in a locked position. In one embodiment, the spring mechanism may be mounted in the center of the seismic node 110 and may be a rubber block, a metal spring, or a metal spring molded in a rubber encapsulation or any other appropriately shaped spring material. The attachment/detachment tool 1308 may be used to hold the deployment line 108 as well as depress the spring in a single action.

Figure 14A:
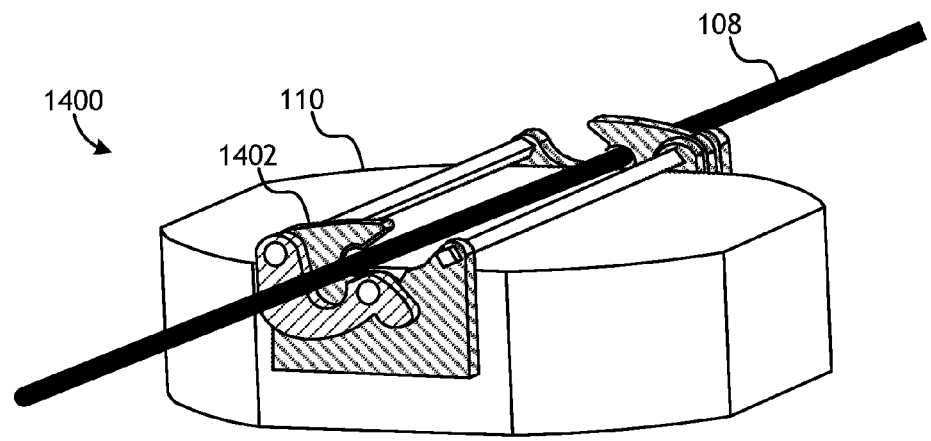
FIG. 14A is a perspective view diagram of one embodiment of a direct attachment mechanism for deployment of a seismic node during attachment.
Figure 14B:
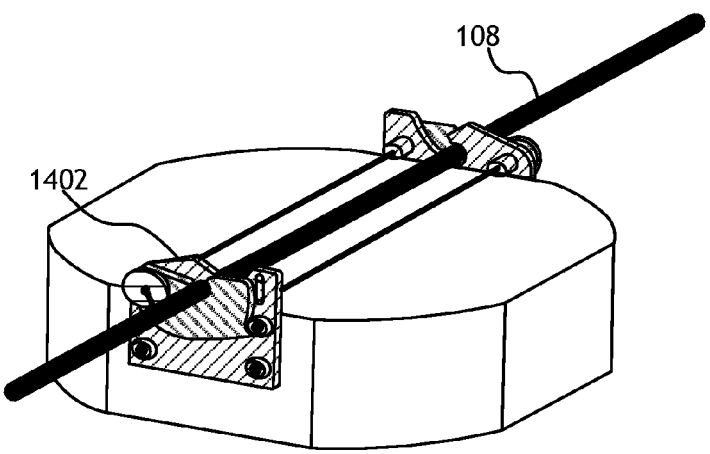
FIG. 14B is a perspective view diagram of one embodiment of the direct attachment mechanism of FIG. 14A after attachment.
Figure 14C:
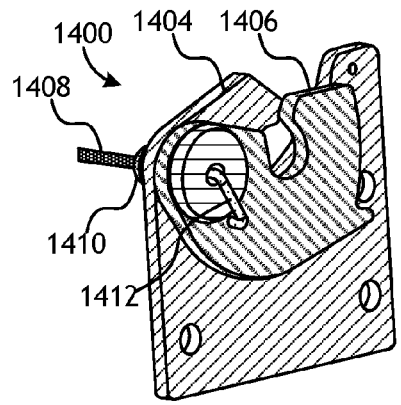
FIG. 14C is a side view diagram of one embodiment of the direct attachment mechanism of FIG. 14A.

FIGS. 14A-B illustrate another embodiment of a torsion spring attachment mechanism 1400. Torsion spring attachment mechanisms 1400 may be attached to a plurality of sides of the node. In the embodiment of FIG. 14A, the torsion lock 1402 is in an open position and receives the deployment line 108 for attaching the seismic node 110 to the deployment line 108. In FIG. 14B, the torsion lock 1402 is in a closed position for retaining the deployment line 108. FIG. 14C illustrates further details of the torsion lock 1402. In an embodiment, the torsion lock 1402 includes a frame plate 1404 having an opening for receiving a length of the deployment line 108 and a locking member 1406 configured to retain the deployment line 108. The torsion lock 1402 additionally includes a torsion spring rod 1408 and one or more spring elements 1410 for biasing the locking member 1406 into a closed position.

Figure 15A:
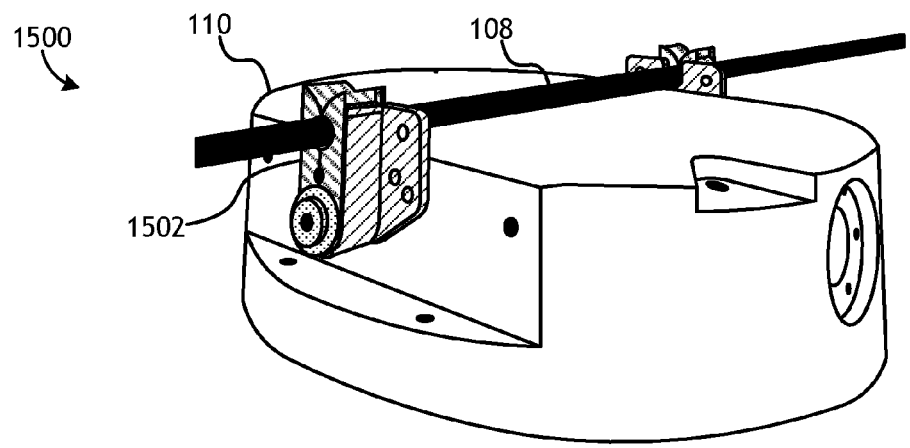
FIG. 15A is a perspective view diagram illustrating one embodiment of a direct attachment mechanism for deployment of a seismic node.
Figure 15B:
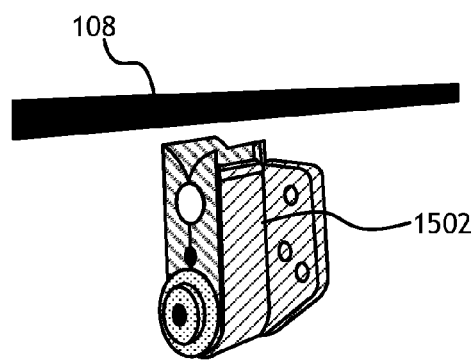
FIG. 15B is a partial view diagram illustrating one embodiment of the direct attachment mechanism of FIG. 15A during attachment.
Figure 15C:
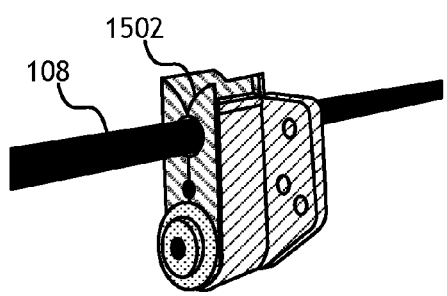
FIG. 15C is a partial view diagram illustrating one embodiment of the direct attachment mechanism of FIG. 15A after attachment.
Figure 15D:
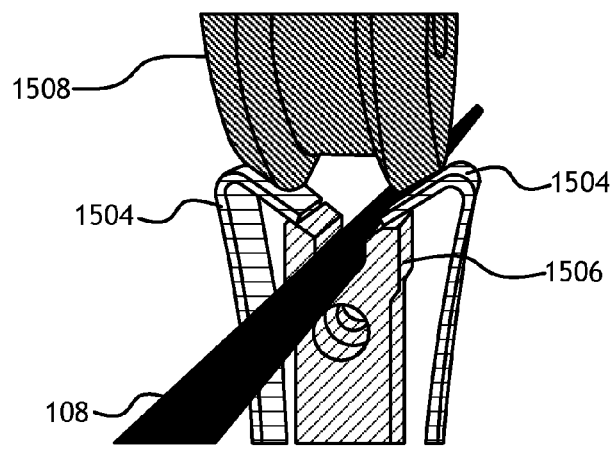
FIG. 15D is a side view diagram illustrating one embodiment of detachment of the direct attachment mechanism of FIG. 15A.

FIGS. 15A-D illustrate another embodiment of a snap-on attachment mechanism 1500. Snap-on attachment mechanisms 1500 may be attached to a plurality of sides of the node. In the embodiment of FIG. 15A, the deployment line 108 may be snapped into place to the seismic node 110 by pressing the deployment line into a receiving end of the snap lock 1502 as shown in FIGS. 15B-C. FIG. 15D illustrates an embodiment of a detachment tool or mechanism 1508 that may be used to actuate snap lock 1502. In an embodiment, the snap-lock 1502 may include a receiver 1506 having an opening configured to receive the deployment line 108 and snap springs 1504 configured to bias the snap lock into a closed position for retaining the deployment line once attached. In the embodiment of FIG. 15D, the detachment tool 1508 may be a roller having flanged edges configured to spread the snap springs into an open position allowing the receiver 1506 to release the deployment line 108. In an alternative embodiment as illustrated in FIGS. 15A-C, the snap springs may only provide the bias into the closed position, and the receiver may be formed with one or more flanged for retaining the deployment line 108 within the receiver 1506.

Figure 16A:
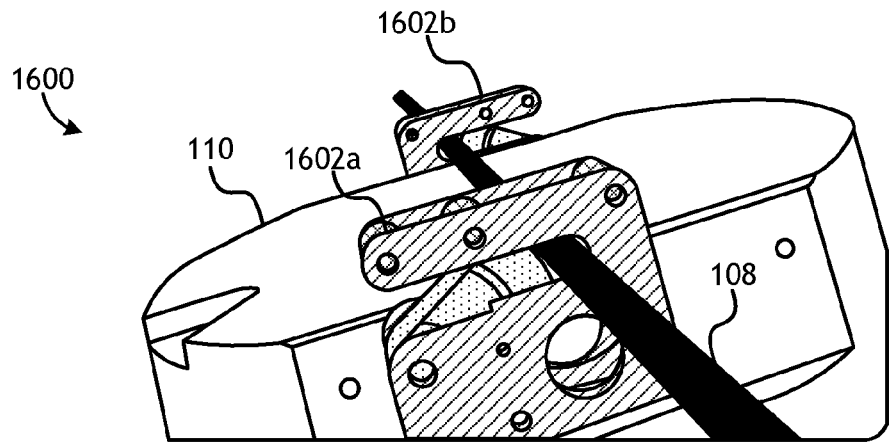
FIG. 16A is a perspective view diagram illustrating one embodiment of a direct attachment mechanism for deployment of a seismic node.
Figure 16B:
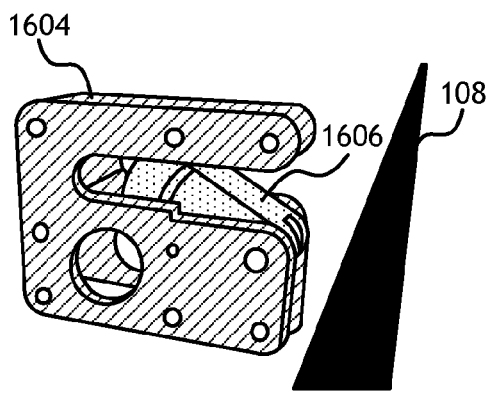
FIG. 16B is a partial view diagram illustrating one embodiment of the direct attachment mechanism of FIG. 16A during attachment.
Figure 16C:
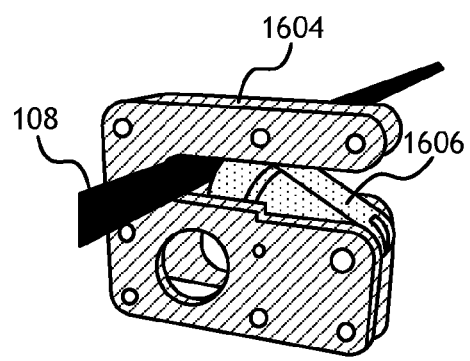
FIG. 16C is a partial view diagram illustrating one embodiment of the direct attachment mechanism of FIG. 16A after attachment.
Figure 16D:
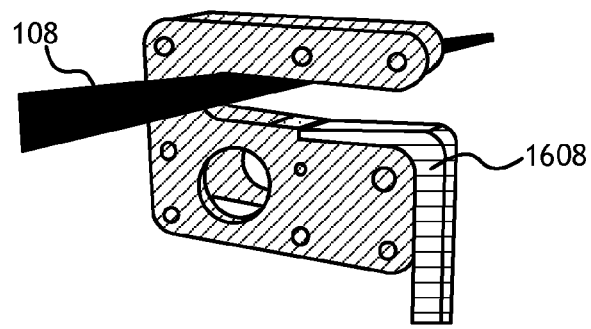
FIG. 16D is a side view diagram illustrating one embodiment of detachment of the direct attachment mechanism of FIG. 16A.

FIGS. 16A-D illustrate an embodiment of a twist-lock attachment mechanism 1600. Twist-lock attachment mechanisms 1600 may be attached to a plurality of sides of the node. In the embodiment of FIG. 16A, attachment mechanism 1600 comprises a frame 1604 and a rotating locking member 1606, such that a hole and/or opening is formed within the frame 1604 to laterally receive a deployment line 108. In such an embodiment, the locking member 1606 may be biased into a closed position, but may be configured to open when the deployment line 108 slides into a locked position as illustrated in FIGS. 16B-C. The locking member 1606 may have a sloped first portion that allows easier attachment of the cable to the lock. The seismic node 110 may be twisted into a locking position on both the first twist lock 1602a and the second twist lock 1602b. Additionally, a detachment tool 1608 may be used to depress the locking member 1606 from a closed/locked position to an open position, thereby allowing detachment of the seismic node 110 from the deployment line 108.

Figure 17A:
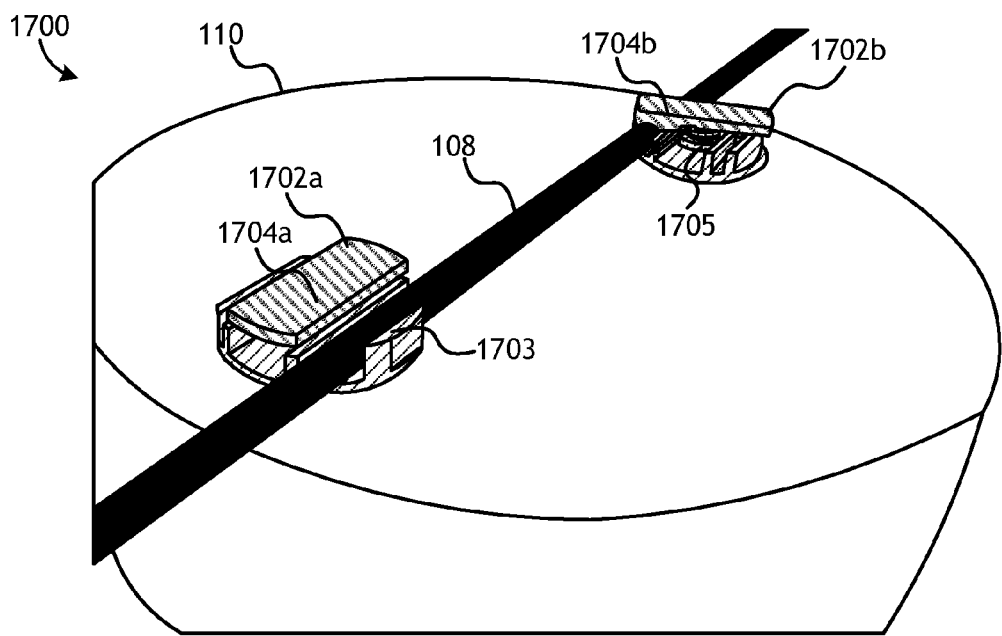
FIG. 17A is a perspective view diagram illustrating one embodiment of a direct attachment mechanism for deployment of a seismic node.
Figure 17B:
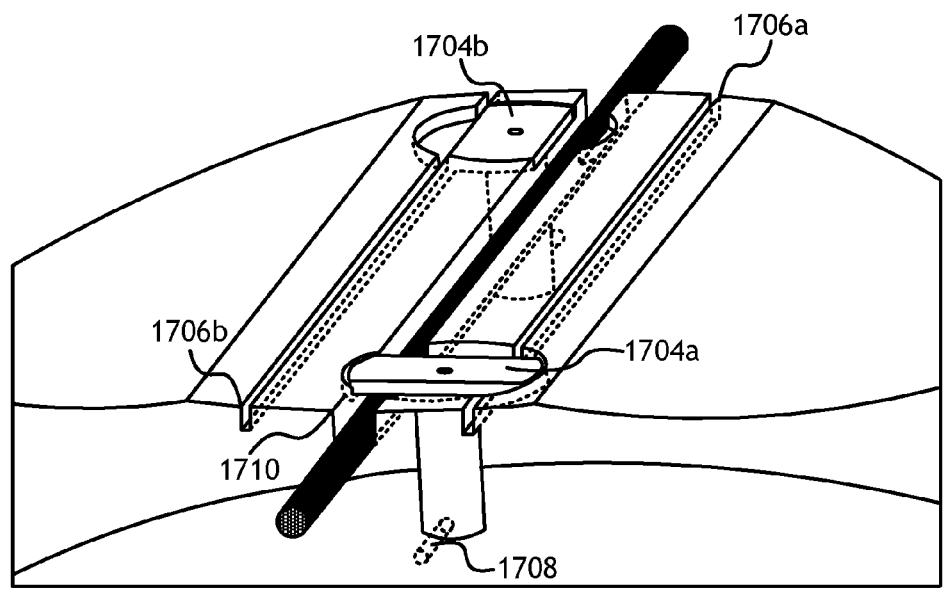
FIG. 17B is a perspective view diagram illustrating another embodiment of a direct attachment mechanism for deployment of a seismic node.

FIGS. 17A-B illustrate embodiments of a twist-lock attachment mechanism 1700. Twist-lock attachment mechanisms 1700 may be attached to a top face of the node. In the embodiment of FIG. 17A, the seismic node 110 may be coupled to the deployment line 108 by a first twist lock 1702a and a second twist lock 1702b. Each twist lock 1702a-b may be located on an outer surface of the seismic node 110. The twist locks 1702a-b include a guide member 1703 for receiving the deployment line 108 and a rotatable locking member 1704 configured to open as shown by locking member 1704a and close as shown by locking member 1704b. In an open position, the deployment line 108 may be received and released. In a closed position, the deployment line 108 may be retained. In a further embodiment the locking member 1704a-b may be biased into a closed position by a bias spring 1705. In the embodiment of FIG. 17B, the twist lock 1702a-b may be recessed in a surface of the seismic node 110 such that the upper surface of twist locks 1702a-b are substantially flush to the surface of node 110. The twist-lock attachment member 1700 may include one or more recessed twist locks 1704a-b and a channel 1710 for receiving the deployment line 108. In a further embodiment, the twist-lock attachment mechanism 1700 may include or be coupled to one or more detachment guides 1706a-b, which may receive a detachment tool (not shown). The detachment tool may run along the detachment guides 1706a-b and twist the twist locks 1704a-b into an open position for releasing the deployment line 108. In a further embodiment, the twist locks 1704a-b may be biased in a closed position by a recessed bias member 1708, such as a spring or a torsion bar.

Figure 18A:
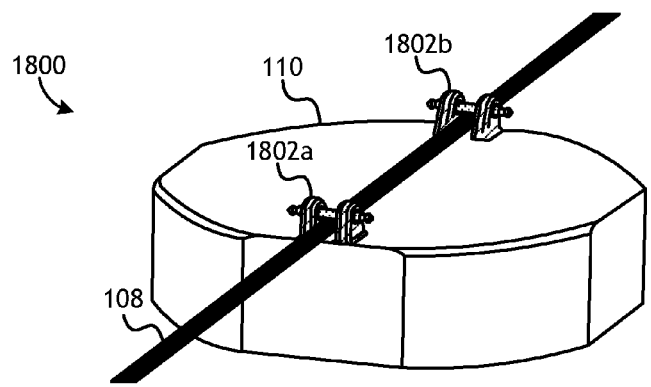
FIG. 18A is a perspective view diagram illustrating one embodiment of a direct attachment mechanism for deployment of a seismic node.
Figure 18B:
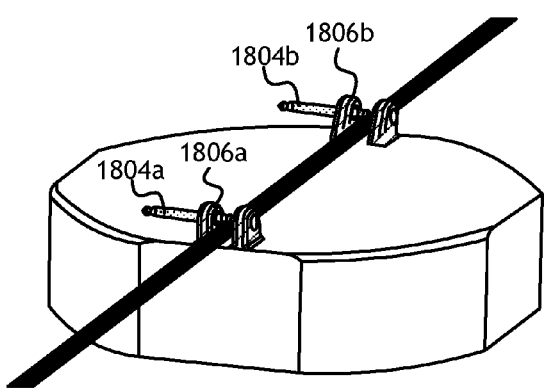
FIG. 18B is a partial view diagram illustrating one embodiment of the direct attachment mechanism of FIG. 18A during attachment.
Figure 18C:
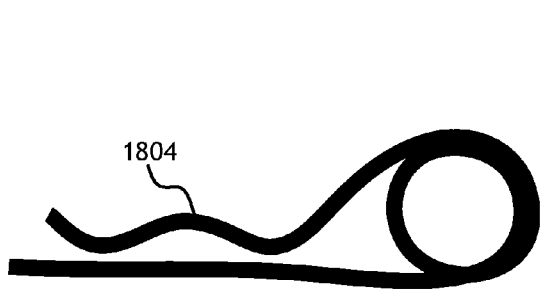
FIG. 18C is a side view diagram illustrating one embodiment of a locking pin for use with the embodiment of FIG. 18A.
Figure 18D:
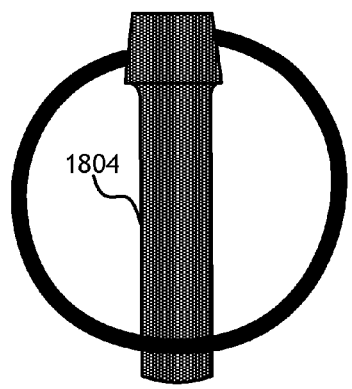
FIG. 18D is a side view diagram illustrating another embodiment of a locking pin for use with the embodiment of FIG. 18A.

FIGS. 18A-D illustrate embodiments of a pin-lock attachment mechanism 1800. Pin-lock attachment mechanisms 1800 may be attached to a top face of the node. In an embodiment, the pin-lock attachment mechanism 1800 may include a first pin lock 1802a and a second pin lock 1802b for attaching the seismic node to a length of the deployment line 108. The pin locks 1802a-b may include receivers 1806a-b for receiving the deployment line 108 and the locking pins 1804a-b. In some embodiments, the locking pins 1804a-b may be removed to allow attachment of the seismic node 110 to the deployment line 108 as shown in FIG. 18B and then fastened to the locking pins to secure the seismic node 110 to the deployment line 108. FIG. 18C illustrates a spring-lock pin, which may be used for locking pin 1804. FIG. 18D illustrates a ring pin, which may be used for locking pin 1804. One of ordinary skill will recognize a variety of additional embodiments of pins, including detent pins, self-locking pins, etc. which may be used with the present embodiment.

Figure 19A:
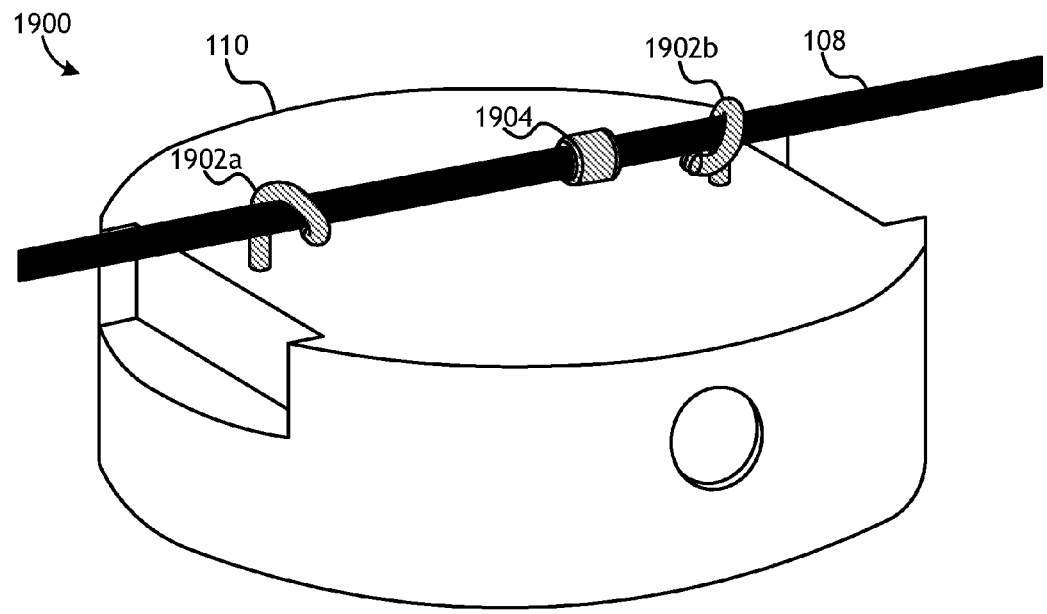
FIG. 19A is a perspective view diagram illustrating one embodiment of a direct attachment mechanism for deployment of a seismic node.
Figure 19B:
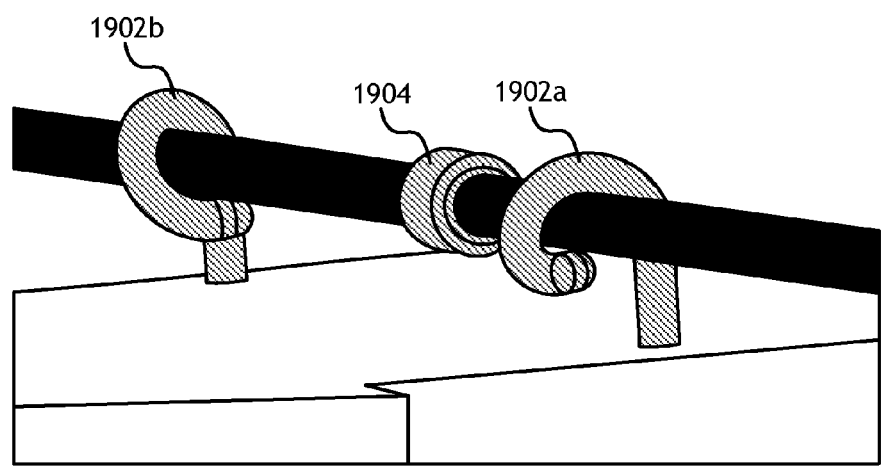
FIG. 19B is a close-up perspective view diagram illustrating one embodiment of the direct attachment mechanism of FIG. 19A.

FIGS. 19A-B illustrate embodiments of a pigtail attachment mechanism 1900. Pigtail attachment mechanisms 1900 may be attached to a top face of the node. In an embodiment, the pigtail attachment mechanism 1900 may include a first pigtail attachment member 1902a and a second pigtail attachment member 1902b configured to receive the deployment line 108 for attaching the seismic node 110 to a length of the deployment line 108. In an embodiment, the deployment line 108 may be threaded through the pigtail attachment members 1902a-b. In another embodiment, the deployment line 108 may be bent or twisted through the opening in the pigtail attachment members 1902a-b and subsequently straightened to secure the deployment line to the attachment mechanism. In a further embodiment, the deployment line 108 may include a retention member 1904 for holding the seismic node 110 in a position on the deployment line 108 by limiting travel of the deployment line 108 through the pigtail attachment members 1902a-b.

Figure 20A:
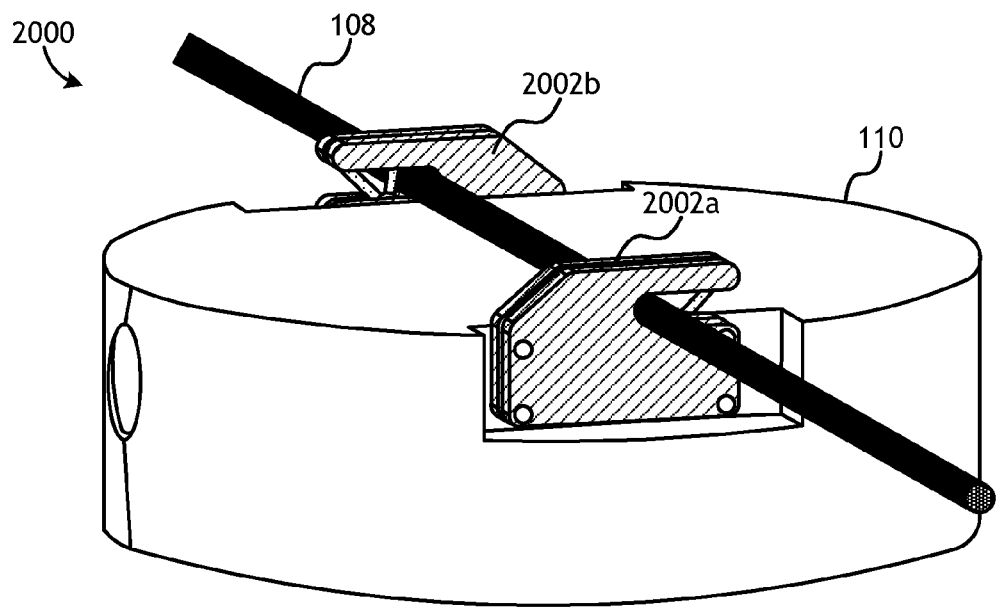
FIG. 20A is a perspective view diagram illustrating one embodiment of a direct attachment mechanism for deployment of a seismic node.
Figure 20B:
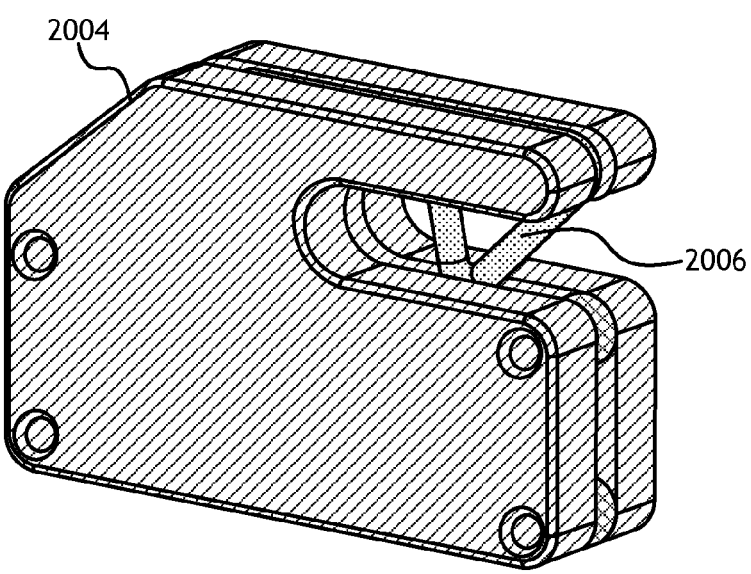
FIG. 20B is a partial perspective view diagram illustrating one embodiment of the locking mechanism of FIG. 20A.

FIGS. 20A-B illustrate embodiments of a wire-lock attachment mechanism 2000. Wire-lock attachment mechanisms 2000 may be attached to a plurality of sides of the node. In an embodiment, the wire-lock attachment mechanism 2000 includes a first wire lock member 2002a and a second wire lock member 2002b for attaching the seismic node 110 to the deployment line 108. As shown in FIG. 20B, each wire lock member 2002a-b may include a frame 2004 for receiving a portion of the deployment line 108 and a releasable locking member 2006 for retaining the deployment line 108. In an embodiment, the releasable locking member 2006 may be a wire or metal band that is angled on a leading edge and is configured such that the releasable locking member 2006 is displaced into an open position when the deployment line 108 is inserted into the frame 2004, but has a straight trailing edge which does not release the deployment line unless acted on by a detachment tool (not shown).

Figure 21A:
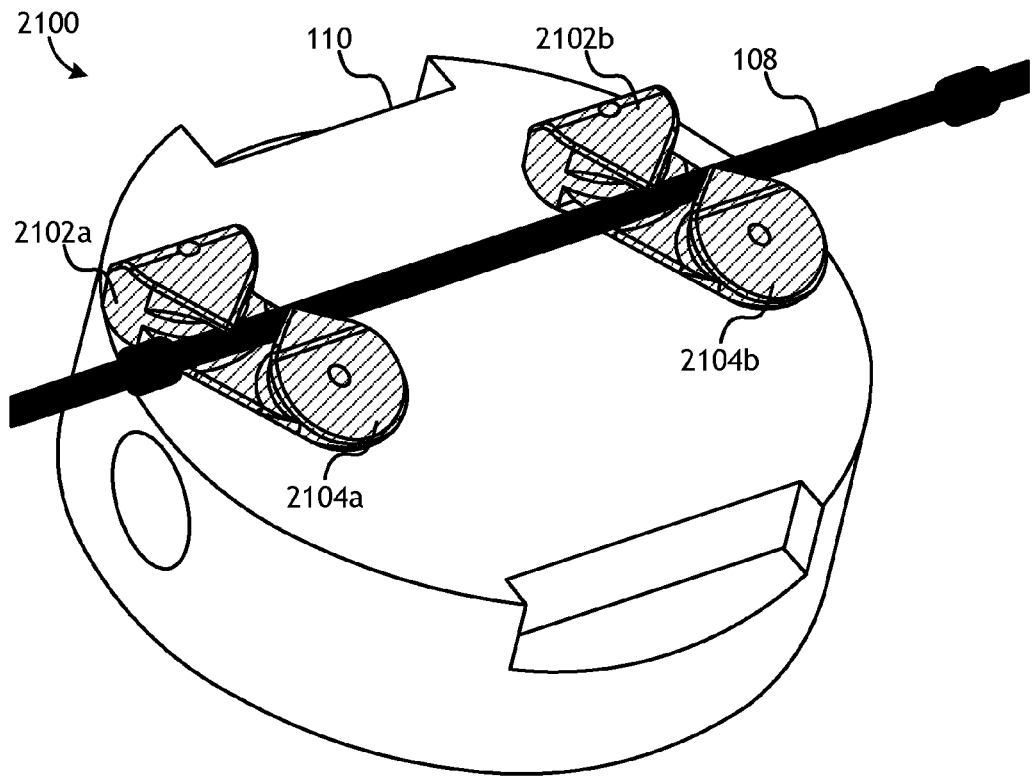
FIG. 21A is a perspective view diagram illustrating one embodiment of a direct attachment mechanism for deployment of a seismic node.
Figure 21B:
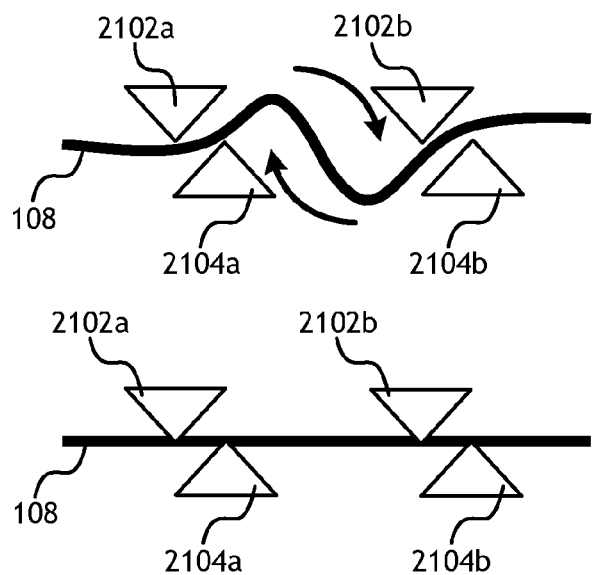
FIG. 21B is a conceptual diagram illustrating one embodiment of a method for twist-wire attachment.

FIGS. 21A-B illustrate an embodiment of a twist-in-place attachment mechanism 2100. Twist-lock attachment mechanisms 2100 may be attached to a top face of the node. In an embodiment the twist-in-place locking mechanism 2100 includes a first retention flange 2102a and a second retention flange 2102b, each with an opposing retention flange 2104a-b respectively. A space or channel may be formed between the retention flange 2102a and retention flange 2104a to receive a deployment line. Each flange may be angled or offset for easier attachment and detachment of the deployment line and may be in the general shape of a circle or triangle when viewed from a top/end perspective of the node lock. As illustrated in FIG. 21B, the deployment line 108 may be twisted through the retention flanges 2102a-b and the opposing retention flanges 2104a-b for attaching the seismic node 110 to the deployment line 108. When straightened, the deployment line 108 may be retained by the retention flanges 2102a-b and the opposing retention flanges 2104a-b. In other embodiments, each flange may be rotatable such that they rotate away from each other to move the node lock into an open position and move towards each other to move the lock into a closed position.

Figure 22A:
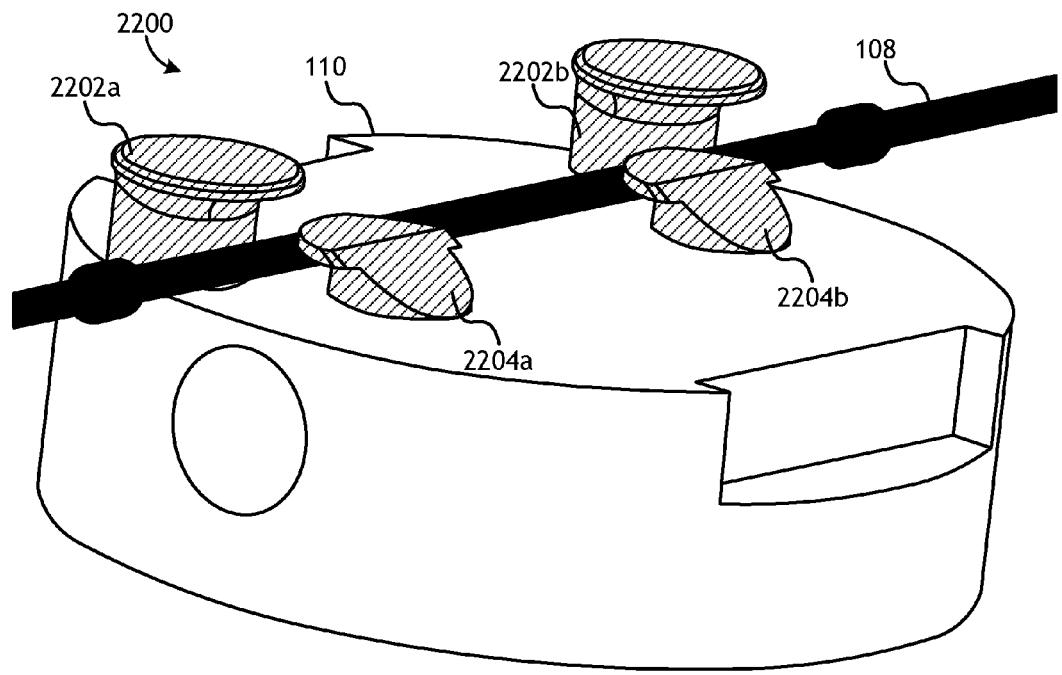
FIG. 22A is a perspective view diagram illustrating one embodiment of a direct attachment mechanism for deployment of a seismic node.
Figure 22B:
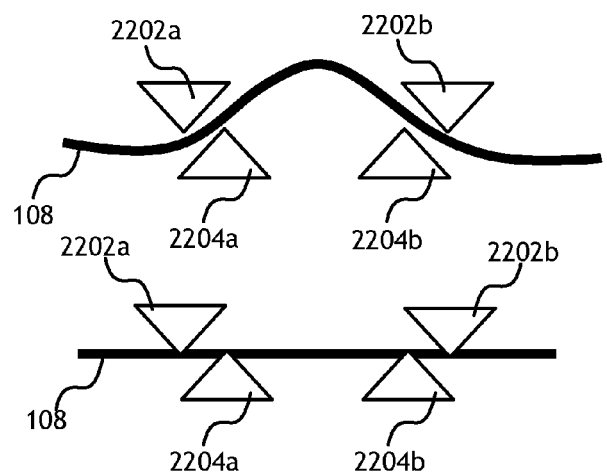
FIG. 22B is a conceptual diagram illustrating one embodiment of a method for bend-wire attachment.

FIGS. 22A-B illustrate an embodiment of a bend-in-place attachment mechanism 2200, which may be similar to the embodiment described in FIGS. 21A-B but does not require as much twisting of the deployment line based on the locations of the flanges. In an embodiment the bend-in-place locking mechanism 2200 includes a first retention flange 2202a and a second retention flange 2202b, each with an opposing retention flange 2204a-b respectively. As illustrated in FIG. 22B, the deployment line 108 may be bent around the retention flanges 2202a-b and the opposing retention flanges 2204a-b for attaching the seismic node 110 to the deployment line 108. When straightened, the deployment line 108 may be retained by the retention flanges 2202a-b and the opposing retention flanges 2204a-b. An advantage of the bend-in-place attachment mechanism is that movable parts may be eliminated or reduced, thereby enhancing the reliability of the locking mechanism.

Figure 23A:
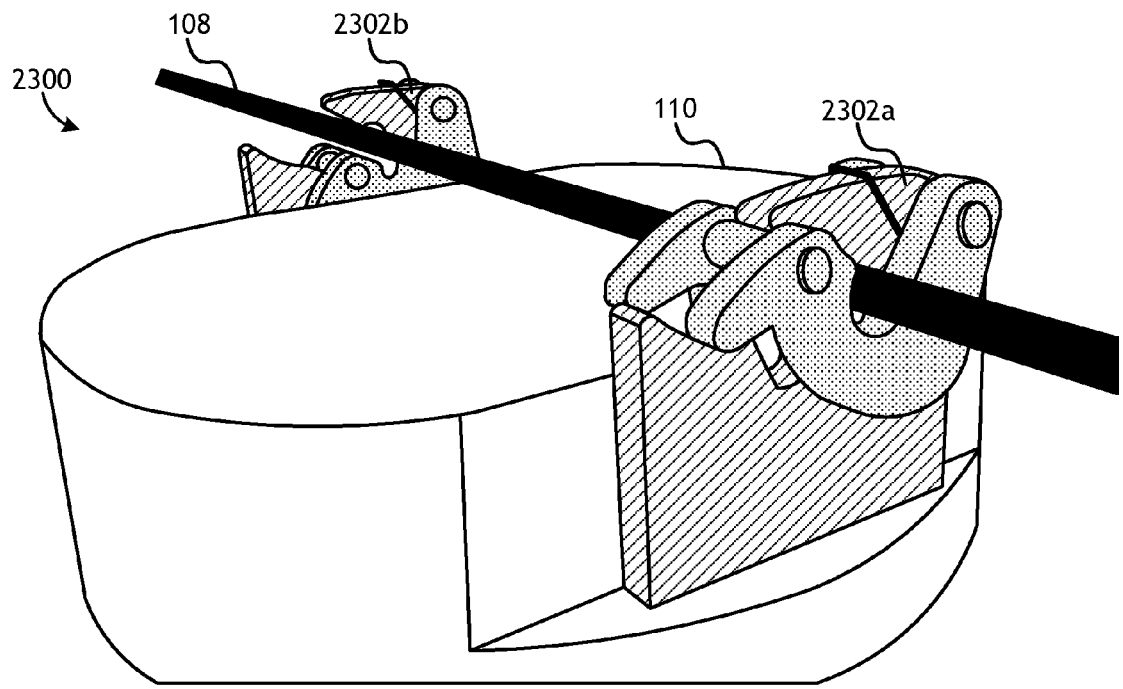
FIG. 23A is a perspective view diagram illustrating one embodiment of a direct attachment mechanism for deployment of a seismic node.
Figure 23B:
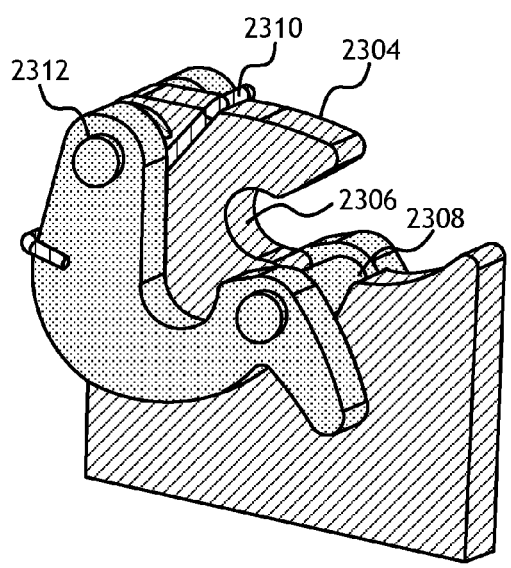
FIG. 23B is a partial perspective view diagram illustrating one embodiment of the locking mechanism of FIG. 23A.

FIGS. 23A-B illustrates an embodiment of a self-lock attachment mechanism 2300. Self-lock attachment mechanisms 2300 may be attached to a plurality of sides of the node. In an embodiment, the self-lock attachment mechanism 2300 includes a first self-lock 2302a and a second self-lock 2302b configured to attach the seismic node 110 to the deployment line 108. As shown in FIG. 23B, the self-lock 2302 may include a frame 2304 with an opening 2306 for receiving the deployment line 108. Additionally, the self-lock 2302 may include a locking member 2308 configured to rotate about a hinge 2312 from an open position to a closed position. In the open position, the self-lock 2302 may receive and release the deployment line 108. In the closed position, the self-lock 2302 may retain the deployment line 108. In an embodiment, the locking member 2308 may be biased into a closed position by a bias member 2310, such as a coil spring.

Figure 24A:
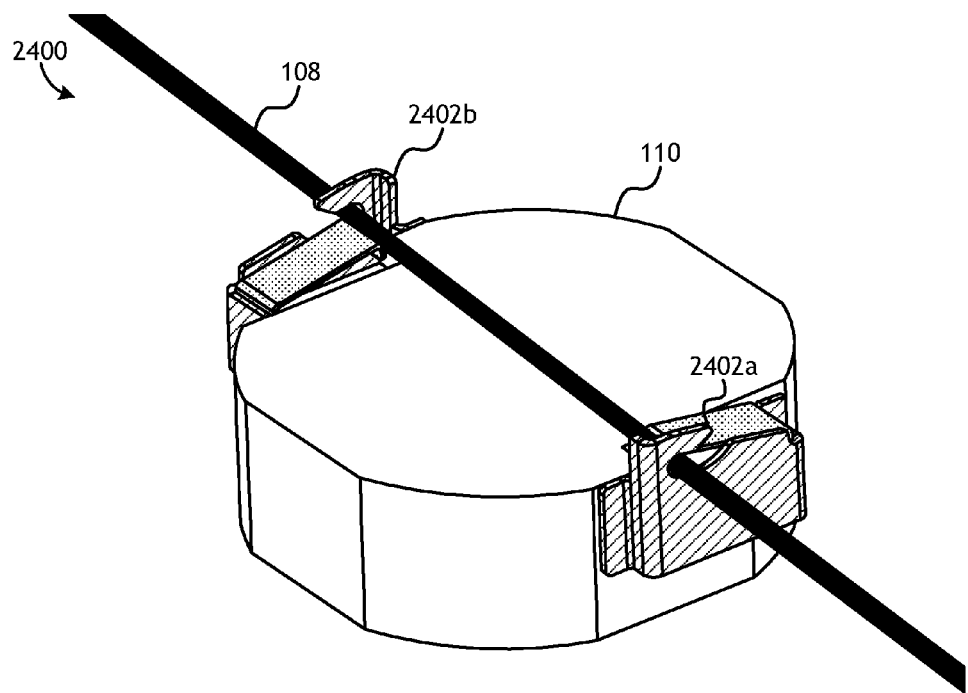
FIG. 24A is a perspective view diagram illustrating one embodiment of a direct attachment mechanism for deployment of a seismic node.
Figure 24B:
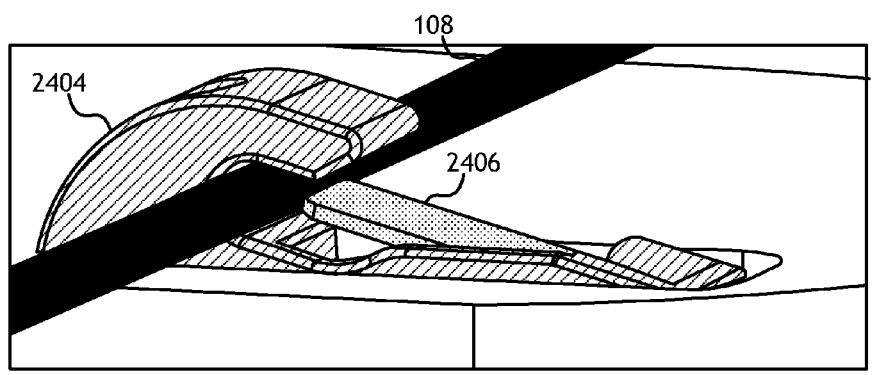
FIG. 24B is a partial perspective view diagram illustrating one embodiment of the locking mechanism of FIG. 24A.

FIGS. 24A-B illustrates an embodiment of a tongue-lock attachment mechanism 2400. In an embodiment, the tongue-lock attachment mechanism 2400 includes a first tongue-lock 2402a and a second tongue-lock 2402b for attaching the seismic node 110 to the deployment line 108. Tongue-locks 2400 may be attached to a plurality of sides of the node. As illustrated in FIG. 24B, the tongue-lock 2402 may include a frame 2404 for receiving the deployment line 108 and a depressible tongue 2406 for retaining the deployment line 108. In an embodiment, the depressible tongue 2406 may be biased in a closed position.

Figure 25A:
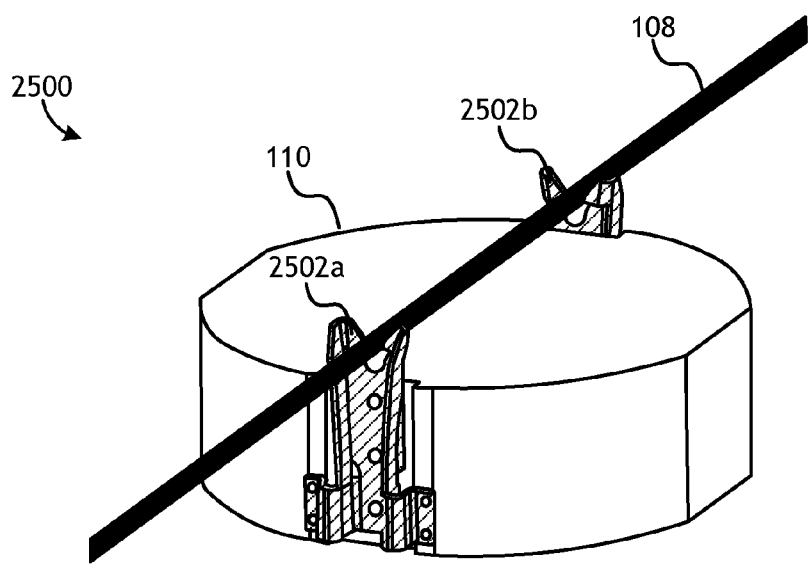
FIG. 25A is a perspective view diagram illustrating one embodiment of a direct attachment mechanism for deployment of a seismic node during attachment.
Figure 25B:
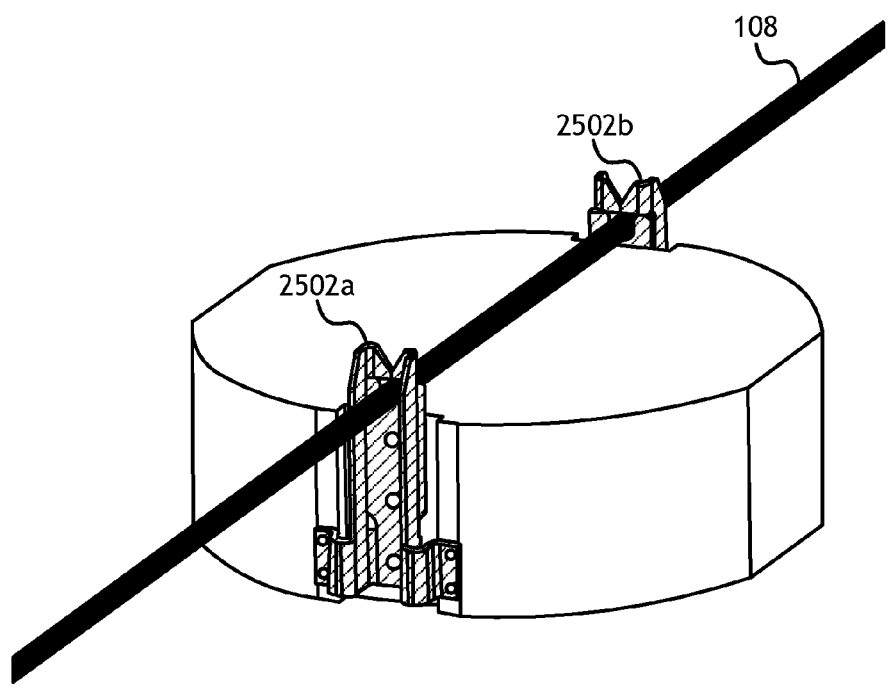
FIG. 25B is a perspective view diagram illustrating one embodiment of the direct attachment mechanism of FIG. 25A after attachment.

FIGS. 25A-B illustrate an embodiment of a top-lock attachment mechanism 2500. Top-lock attachment mechanisms 2500 may be attached to a plurality of sides of the node. In an embodiment, the top-lock attachment mechanism 2500 includes a first top lock 2502a and a second top lock 2502b for attaching the seismic node 110 to the deployment line 108. In one embodiment, the top locks 2502a-b may be made of sheet metal that is bent and cut to shape. In another embodiment, the locks may be made of a shape-memory alloy such as copper-aluminum-nickel or nickel-titanium alloys. The sheet metal may comprise a resilient metal material such that the top locks 2502a-b may be forced into an open position as shown in FIG. 25A and return to a closed position as shown in FIG. 25B automatically once the deployment line has been fully received in the lock 2502. In the open position, the top locks 2502a-b may receive and release the deployment line and in a closed position as shown in FIG. 25B the top locks 2502a-b may retain the deployment line. In an embodiment, the shape and position of the top locks 2502a-b may be configured such that the locks 2502a-b automatically open when receiving the deployment line 108 as it is pressed into the opening of the locks 2502*a-b*. For example, as shown in FIGS. 25A-B, the top locks 2502*a-b* may have a tapered leading edge to an opening and a flat trailing edge for retaining the deployment line 108.

Figure 26A:
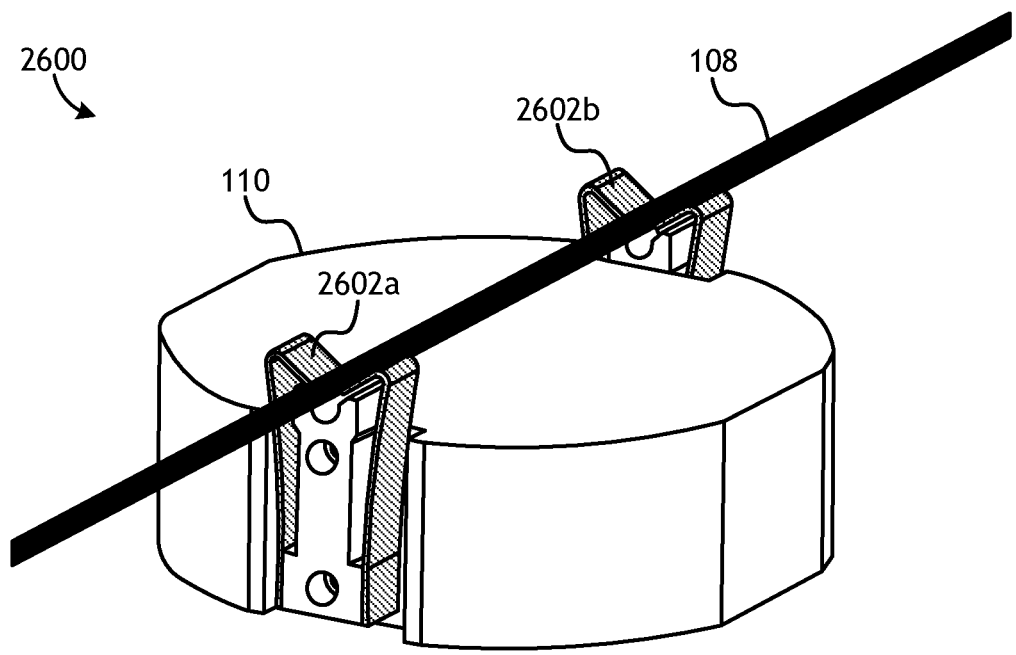
FIG. 26A is a perspective view diagram illustrating one embodiment of a direct attachment mechanism for deployment of a seismic node.
Figure 26B:
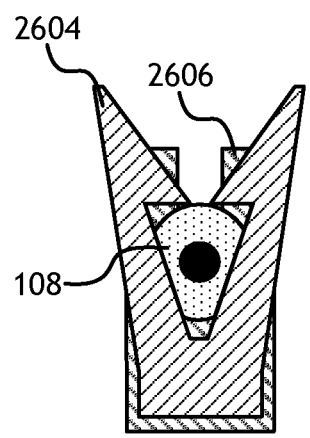
FIG. 26B is a partial view diagram illustrating one embodiment of a tool for detachment of the direct attachment mechanism of FIG. 26A.

FIGS. 26A-B illustrate an embodiment of a snap-lock attachment mechanism 2600. Snap-lock attachment mechanisms 2600 may be attached to a plurality of sides of the node. The snap-lock attachment mechanism 2600 may include a first snap lock 2602*a* and a second snap lock 2602*b* for attaching the seismic node 110 to the deployment line 108. As illustrated in FIG. 26B, each snap lock 2602*a-b* may include a guide 2606 and one or more locking members 2604. In an embodiment, the locking members 2604 may be flexible, such that they may be displaced from a closed position into an open position for receiving and releasing the deployment line. When attaching the seismic node 110 to the deployment line, the snap locks 2602 may be snapped on to the deployment line by applying a force between the deployment line 108 and the locking members 2604 as shown in FIG. 26B. As the deployment line 108 is pressed into the snap locks 2602*a-b*, the locking members 2604 may be flexed into an open position. Once the deployment line 108 is resting in the guide 2606, the locking members 2604 may return to the closed position.

Figure 27A:
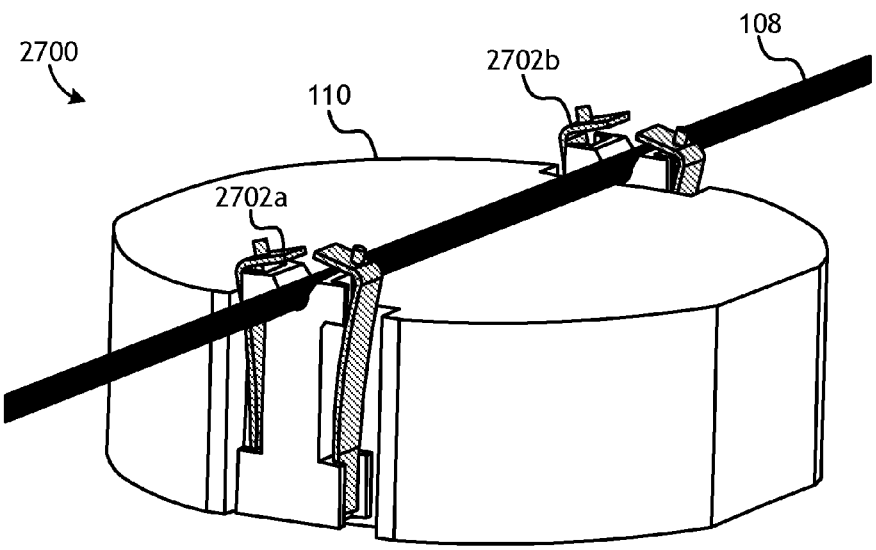
FIG. 27A is a perspective view diagram illustrating one embodiment of a direct attachment mechanism for deployment of a seismic node during attachment.
Figure 27B:
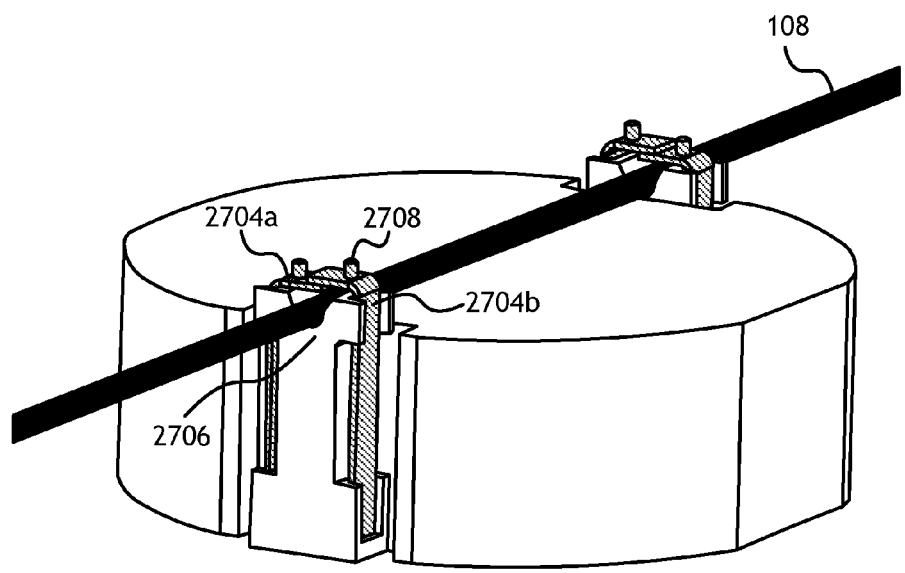
FIG. 27B is a perspective view diagram illustrating one embodiment of the direct attachment mechanism of FIG. 27A after attachment.

FIGS. 27A-B illustrate an embodiment of a no-snap attachment mechanism 2700. No snap attachment mechanism 2700 may be attached to a plurality of sides of the node. Unlike the snap-lock attachment mechanism 2600 of FIGS. 26A-B, the no-snap attachment mechanism 2700 does not allow the deployment line 108 to simply snap in place. Rather, the no-snap attachment mechanism 2700 may be actuated from a closed position to an open position as shown in FIG. 27B. The locking members 2704*a-b* may be actuated by an actuator 2708 on each locking member 2704*a-b* to move from an open position to a closed position and vice versa. In the open position, the deployment line 108 may be received by a guide 2706. In the closed position, the deployment line 108 may be retained by locking members 2704*a-b* as shown in FIG. 27A. One of ordinary skill will recognize various embodiments of actuators 2708 that may be suitable for use with the present embodiments.

Figure 28A:
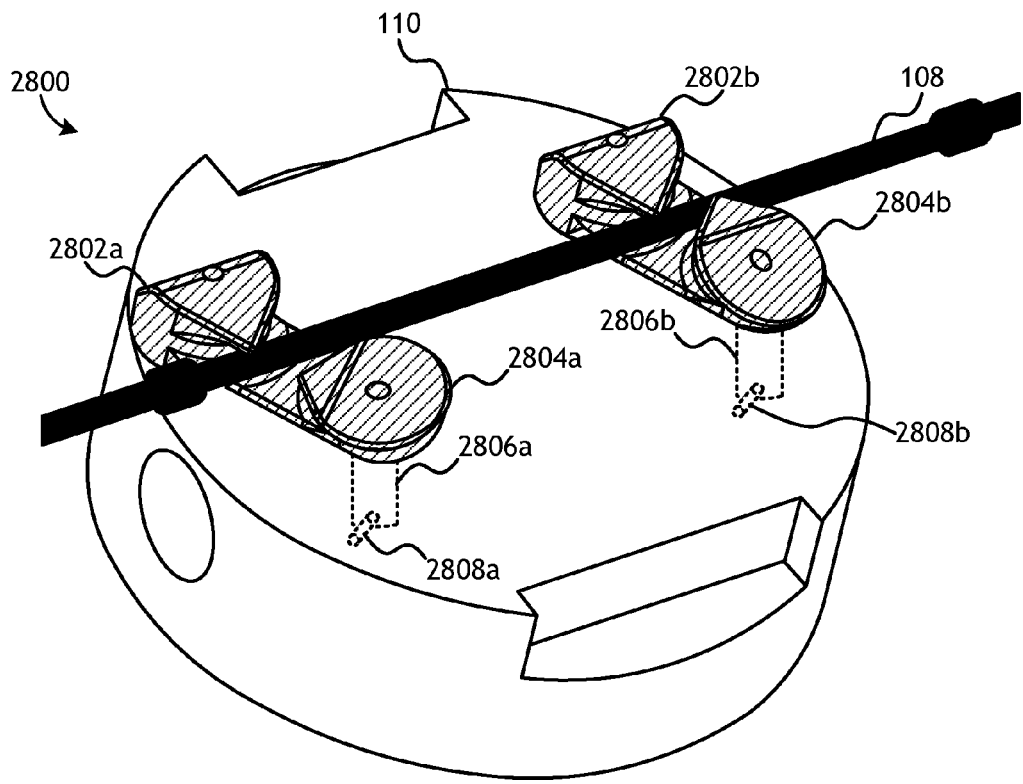
FIG. 28A is a perspective view diagram illustrating one embodiment of a direct attachment mechanism for deployment of a seismic node.
Figure 28B:
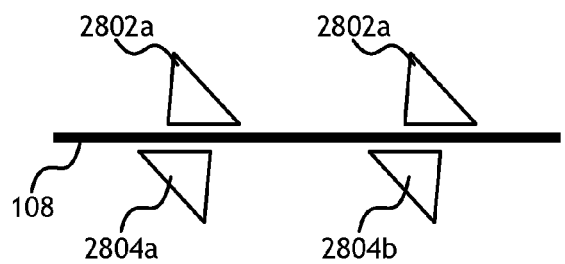
FIG. 28B is a conceptual diagram illustrating one embodiment of a twist-lock direct attachment mechanism as illustrated in FIG. 28A.
Figure 28B:
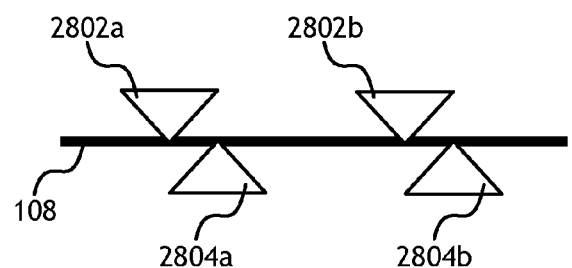

FIGS. 28A-B illustrate embodiments of a twist-lock attachment mechanism 2800 for attaching the seismic nodes 110 to the deployment line 108. Twist-lock attachment mechanisms 2800 may be attached to a top face of the node. In an embodiment, the twist-lock attachment mechanism 2800 may include a first retaining member 2802*a* and a second retaining member 2802*b* for retaining a portion of the deployment line 108. The twist-lock attachment mechanism 2800 may also include a first twist-lock 2804*a* and a second twist lock 2804*b*. In a further embodiment, the first and second retaining members 2802*a-b* may also be twist locks that may twist in place as described with relation to the first and second twist locks 2804*ba-b*. In an embodiment, the first and second twist locks 2804*a-b* may each include a rotatable body 2806*a-b*, which may be biased in a closed position by a recessed bias member 2808*a-b*, such as a spring. Each twist lock may be located on an outer surface of the seismic node 110. FIG. 28B illustrates an embodiment of the twist-lock attachment mechanism 2800 in an open and closed position with a conceptual diagram. In a further embodiment, an external guide mechanism (not shown) is used to guide the deployment line 108 and rotate a rotating head of the attachment mechanism (which may be similar to the rotatable locking member 1704 of FIG. 17A) until the slots are in alignment with the deployment line. The rotating head mechanism is allowed to return to its starting position and in doing so retains the deployment line 108, as shown in FIG. 28B. In an open position, the deployment line 108 may be received and released. In a closed position, the deployment line 108 may be retained. In a further embodiment, the rotating head locking member in FIG. 28B may be biased into a closed position by a bias spring (not shown).

Figure 29:
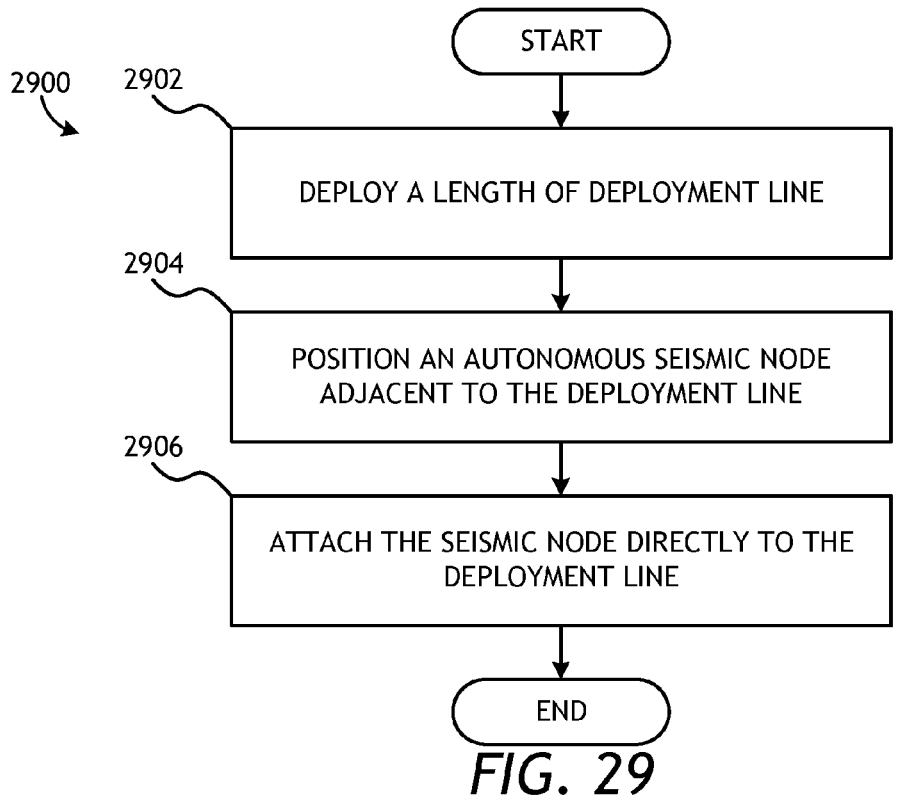
FIG. 29 is a flow chart showing one embodiment of a deployment method of an autonomous seismic node directly attached to a deployment line.

FIG. 29 illustrates one embodiment of a method 2900 for attaching an autonomous seismic node to a deployment line. In an embodiment, the method starts at block 2902 by deploying a length of a deployment line 108 from a marine vessel. At block 2904, the method includes positioning the seismic node 110 relative to a length or portion of the deployment line 108. In one embodiment, the seismic node 110 is accelerated up to the same linear velocity as the deployment line. In other embodiments, the deployment line may be temporarily stopped or paused while a node is manually attached to the deployment line. At block 2906, the method includes directly attaching the seismic node 110 to the length of the deployment line 108 using a direct attachment mechanism. Examples of direct attachment mechanisms are described in FIGS. 2-28. In some embodiments, the direct attachment mechanism needs to be opened or unlocked prior to receiving the deployment line, and in other embodiments, the direct attachment mechanism is already unlocked and/or is biased in an open position. In some embodiments, an attachment tool is used to actuate the locking mechanism from a closed to open position. In other embodiments, the deployment line is pushed into engagement with the node locks to move them from a closed to open position. Once the deployment line engages and/or is otherwise coupled to the direct attachment mechanism, the seismic node 110 may further be secured to the attachment mechanism by a locking mechanism, which may be part of and/or coupled to the attachment mechanism. In one embodiment, the seismic node 110 is directly attached onto the deployment line 108 in an automated process using node attachment or coupling machines on board the deck of the marine vessel 106 at one or more workstations or containers. In other embodiments, the positioning and attaching may be performed by manual or semi-automatic methods. In one embodiment, the deployment line 108 is stopped in the correct position and the seismic node 110 is manually attached to the deployment line 108, and in another embodiment the seismic node 110 is accelerated to match the deployment speed of the deployment line 108 and automatically attached to the deployment line. In a further embodiment, a reference marker on specified intervals of the deployment line 108, such as ferrules, colored painted markers, magnetic paint, or any low profile marking system such as heat shrink, may be used to align the deployment line 108 with the appropriate portions of the attachment mechanism on the seismic node 110 for attaching the seismic node 110 to the deployment line 108. Steps 2902, 2904, and 2906 are repeated until the desired number of seismic nodes 110 is attached to the deployment line 108.

Figure 30:
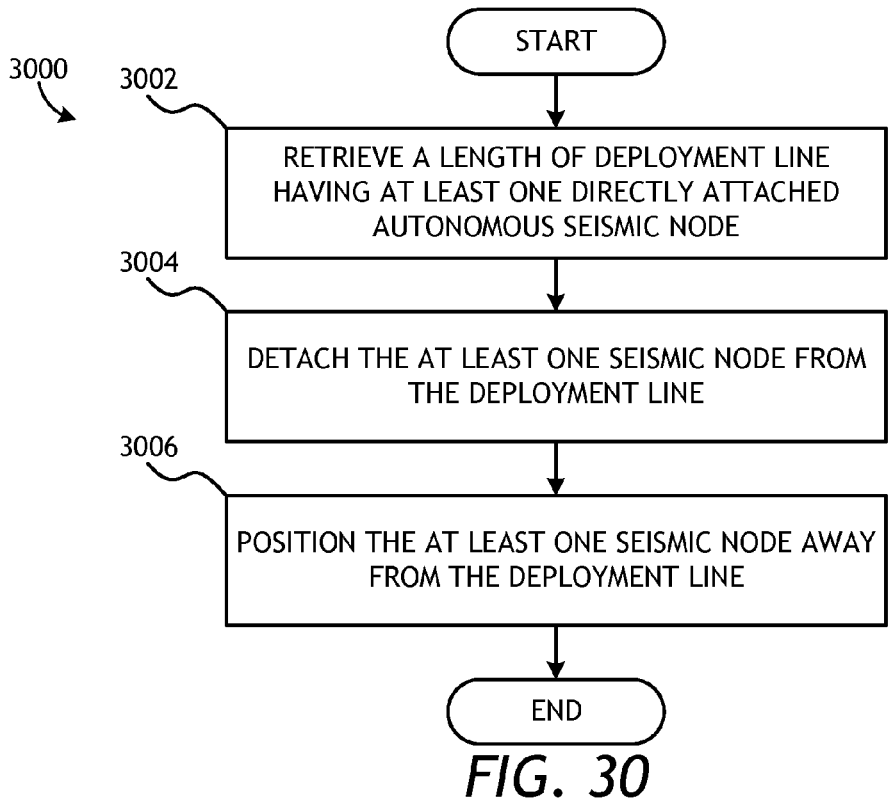
FIG. 30 is a flow chart showing one embodiment of a retrieval method of an autonomous seismic node directly attached to a deployment line.

FIG. 30 illustrates one embodiment of a method 3000 for detaching an autonomous seismic node 110 from the deployment line 108. In an embodiment, the method starts at block 3002 with retrieving a length of deployment line 108, the deployment line 108 having at least one attached seismic node 110, the attached seismic node 110 being attached directly to the deployment line 108 with at least one direct attachment mechanism, such as those illustrated in FIGS. 2-28. In one embodiment, the deployment line is retrieved at the back deck of a marine vessel. At block 3004, the method includes detaching the seismic node 110 from the length of the deployment line 108. The detaching step may be performed manually, semi-automatically, or automatically. In one embodiment, the detaching step may use a decoupling machine or station to remove the seismic nodes 110 from the deployment line 108, which may or may not be the same machine used to couple the nodes to the deployment line. For example, the vessel 106 may contain separate coupling and decoupling machines. In some embodiments, automatically detaching the seismic node 110 may include actuating a portion of the direct attachment mechanism and/or locking mechanism by a detachment tool for releasing the deployment line 108, such as that described in FIG. 2F. The detachment tool may be integrated with the decoupling system or be a separate component that can be used manually or semi-automatically. In some embodiments, the detachment tool also operates as the attachment tool. In one embodiment, the detachment mechanism is accelerated to the same velocity as the deployment line 108 when decoupling the node lock from the deployment line. In other embodiments, the deployment line is pulled by force from the node locks to disengage the deployment line from the node. As shown in block 3006, once the node has been removed and/or decoupled from the deployment line, the detached node is positioned away from the deployment line and transferred out of the retrieval line path so that detachment machine/mechanism is then in a ready position to accept another node to decouple from the deployment line.

Many other variations in overall configuration, style of nodes, number and arrangement of node locks and/or direct attachment mechanisms are possible within the scope of the invention. For example, while many of the disclosed embodiments discuss the attachment of a deployment line, other devices, mechanisms, or cables may be directly attached to the node via the direct attachment mechanism. In other examples, the direct attachment mechanisms may be opened and/or closed with a magnet or by the use of force by a simple metal rod, push stick, or fork. In other embodiments, any portion of a disclosed node lock can be used with the other disclosed locks, whether it is a magnet, pipe lock, closed chamber, clip, wedge, button, lever, or sliding latch type of locking mechanism (or still other embodiments). For example, an attachment mechanism in a certain configuration and/or position on the node may utilize any number of node locks or retaining members, whether or not such a combination or embodiment is specifically disclosed in this application. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. An autonomous seismic node, comprising:
one or more direct attachment mechanisms on the seismic node configured for directly attaching the seismic node to a deployment line, wherein the one or more direct attachment mechanisms is configured to allow the seismic node to freely rotate about the deployment line.

2. The autonomous seismic node of claim 1, wherein the one or more direct attachment mechanisms are configured to move between an open position and a closed position.

3. The autonomous seismic node of claim 1, wherein the one or more direct attachment mechanisms are configured to move between a locked position and an unlocked position.

4. The autonomous seismic node of claim 1, wherein the one or more direct attachment mechanisms comprises a receiving member for receiving the deployment line and a retaining member for retaining the deployment line.

5. The autonomous seismic node of claim 1, wherein the one or more direct attachment mechanisms comprise a leading end that is configured to receive the deployment line and a trailing end that is configured for retaining the deployment line.

6. The autonomous seismic node of claim 1, wherein the one or more direct attachment mechanisms comprise a plurality of direct attachment mechanisms on a plurality of sides of the node.

7. The autonomous seismic node of claim 1, wherein the one or more direct attachment mechanisms are positioned on one face of the node.

8. The autonomous seismic node of claim 1, wherein the one or more direct attachment mechanisms comprise at least a latch, wherein the latch is configured to rotate between a closed position and an open position.

9. The autonomous seismic node of claim 1, wherein the one or more direct attachment mechanisms is configured to rotate between an open position and a closed position.

10. The autonomous seismic node of claim 1, wherein the one or more direct attachment mechanisms comprises a flexible portion that is configured to move between an open position and a closed position.

11. The autonomous seismic node of claim 1, wherein the seismic node comprises a pressure housing at least partially enclosed by a non-pressure housing, wherein the at least one direct attachment mechanism is coupled to at least the pressure housing.

12. The autonomous seismic node of claim 1, wherein the seismic node comprises a pressure housing at least partially enclosed by a non-pressure housing, wherein the at least one direct attachment mechanism is coupled to at least the non-pressure housing.

13. The autonomous seismic node of claim 1, wherein the at least one direct attachment mechanism comprises a plurality of protrusions on at least one face of the node that are configured for attaching the deployment line to the seismic node.

14. The autonomous seismic node of claim 1, wherein the at least one direct attachment mechanism comprises a bias member configured to bias the attachment mechanism in a closed position.

15. The autonomous seismic node of claim 1, wherein the at least one direct attachment mechanism is configured to remain in a closed position unless opened.

16. The autonomous seismic node of claim 1, wherein the deployment line has clearance around its circumference when coupled to the one or more direct attachment mechanisms to allow free rotation of the one or more direct attachment mechanisms around the deployment line.

17. The autonomous seismic node of claim 1, wherein the one or more direct attachment mechanisms has a closed position and an open position, wherein the closed position is configured to allow free rotation of the one or more direct attachment mechanisms around the deployment line.

18. The autonomous seismic node of claim 1, wherein the one or more direct attachment mechanisms is configured to allow the node to slide along the deployment line.

19. The autonomous seismic node of claim 1, wherein the deployment line is coupled to a plurality of ferrules, wherein the node is configured to slide between adjacent ferrules of the plurality of ferrules when attached to the deployment line.

20. The autonomous seismic node of claim 1, wherein the one or more direct attachment mechanisms comprise a grooved protrusion on an upper surface of the node that is configured to receive a deployment line, wherein the protrusion comprises a plurality of retaining members configured to lock the deployment line to the direct attachment mechanism.

21. The autonomous seismic node of claim 1, wherein the one or more direct attachment mechanisms is configured to receive a curved, torqued portion of the deployment line in an unlocked position and to lock the deployment line when it is substantially straight.

22. A marine seismic system comprising:
a marine vessel;
a deployment line; and
at least one autonomous seismic node configured for direct attachment to the deployment line by one or more direct attachments mechanisms coupled to the node;
wherein the one or more direct attachment mechanisms is configured to receive a length of the deployment line, wherein the one or more direct attachment mechanisms is configured to allow the seismic node to freely rotate about the deployment line.

23. The system of claim 22, wherein the one or more direct attachment mechanisms are configured to move between an open position and a closed position.

24. A method comprising:
deploying a deployment line from a marine vessel;
positioning at least one seismic node with at least one direct attachment mechanism located on the seismic node next to a length of the deployment line; and
attaching the at least one seismic node directly to the length of the deployment line using the at least one direct attachment mechanism, wherein the at least one direct attachment mechanism is configured to allow the seismic node to freely rotate about the deployment line.

25. The method of claim 24, further comprising attaching a plurality of autonomous seismic nodes, each with at least one direct attachment mechanism, to a plurality of sections of the deployment line.

26. The method of claim 24, further comprising actuating the at least one direct attachment mechanism into an open position for receiving the length of the deployment line.

27. The method of claim 24, further comprising rotating the at least one direct attachment mechanism into an open position for receiving the length of the deployment line.

28. The method of claim 24, further comprising forcing the deployment line into a locked position with the at least one direct attachment mechanism.

29. The method of claim 24, further comprising actuating the at least one direct attachment mechanism into a closed position for retaining the length of the deployment line.

30. The method of claim 24, further comprising positioning the deployment line into the at least one direct attachment mechanism to force the direct attachment mechanism into a locked position around the deployment line.

31. A method comprising:
retrieving a deployment line on a marine vessel, the deployment line having at least one autonomous seismic node directly attached to the deployment line, wherein the at least one node is attached directly to the deployment line with at least one direct attachment mechanism located on the seismic node, wherein the at least one direct attachment mechanism is configured to allow the seismic node to freely rotate about the deployment line; and
detaching the at least one seismic node from the deployment line.

32. The method of claim 31, further comprising actuating the at least one direct attachment mechanism into an open position for releasing the length of the deployment line.

33. The method of claim 31, wherein the detaching step comprising using a detachment tool separate from the at least one direct attachment mechanism to actuate the at least one direct attachment mechanism into an open position.

34. The method of claim 31, wherein the detaching step comprises using force on the deployment line to pull the deployment line from the at least one direct attachment mechanism.

35. The method of claim 31, wherein the detaching step comprises using torqued rotation force to change the linear shape of the deployment line.

* * * * *